United States Patent
Kim et al.

(10) Patent No.: US 11,251,659 B2
(45) Date of Patent: Feb. 15, 2022

(54) APPARATUS AND METHOD FOR DETECTING FOREIGN OBJECT IN WIRELESS POWER TRANSMISSION SYSTEM

(71) Applicant: LG ELECTRONICS INC., Seoul (KR)

(72) Inventors: Kyunghwan Kim, Seoul (KR); Yongcheol Park, Seoul (KR); Gyunghwan Yook, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/269,508

(22) PCT Filed: Aug. 13, 2019

(86) PCT No.: PCT/KR2019/010321
§ 371 (c)(1),
(2) Date: Feb. 18, 2021

(87) PCT Pub. No.: WO2020/040475
PCT Pub. Date: Feb. 27, 2020

(65) Prior Publication Data
US 2021/0194295 A1    Jun. 24, 2021

(30) Foreign Application Priority Data
Aug. 21, 2018    (KR) ................. 10-2018-0097237

(51) Int. Cl.
*H02J 50/60*    (2016.01)
*H02J 50/80*    (2016.01)
(Continued)

(52) U.S. Cl.
CPC ............... *H02J 50/60* (2016.02); *H02J 7/02* (2013.01); *H02J 50/40* (2016.02); *H02J 50/80* (2016.02)

(58) Field of Classification Search
CPC .. H02J 50/60; H02J 50/80; H02J 50/40; H02J 7/02; H02J 7/0013; H02J 7/025; H01F 38/14
(Continued)

(56) References Cited

U.S. PATENT DOCUMENTS

2014/0145515 A1* 5/2014 Jung ................. H02J 7/025
                                                      307/104
2016/0118810 A1* 4/2016 Park ................. H02J 7/0013
                                                      307/104
(Continued)

FOREIGN PATENT DOCUMENTS

KR    10-2016-0028252    3/2016
KR    10-2018-0010796    1/2018
(Continued)

OTHER PUBLICATIONS

PCT International Application No. PCT/KR2019/010321, International Search Report dated Nov. 21, 2019, 4 pages.

*Primary Examiner* — Alfonso Perez Borroto
(74) *Attorney, Agent, or Firm* — Lee, Hong, Degerman, Kang & Waimey PC

(57) ABSTRACT

The present specification discloses a method for receiving wireless power from a wireless power transmission device on the basis of foreign object detection, the method comprising the steps of: receiving a digital ping from the wireless power transmission device; transmitting identification and configuration packets to the wireless power transmission device; transmitting a foreign substance detection state packet indicating a reference Q factor value of a wireless power reception device to the wireless power
(Continued)

transmission device; and receiving wireless power through magnetic coupling from the wireless power transmission device, on the basis of a result of foreign substance detection using the reference Q factor value by the wireless power transmission device.

13 Claims, 28 Drawing Sheets

(51) Int. Cl.
*H02J 50/40* (2016.01)
*H02J 7/02* (2016.01)
(58) Field of Classification Search
USPC .......................................... 307/104
See application file for complete search history.

(56) References Cited

U.S. PATENT DOCUMENTS

| | | | |
|---|---|---|---|
| 2016/0172895 A1* | 6/2016 | Lee | H01F 38/14 320/108 |
| 2017/0366048 A1 | 12/2017 | Watanabe et al. | |
| 2018/0219431 A1* | 8/2018 | Guillermo | H02J 50/60 |

FOREIGN PATENT DOCUMENTS

| | | |
|---|---|---|
| WO | 2013005860 | 1/2013 |
| WO | 2018144392 | 8/2018 |

\* cited by examiner

FIG. 3B

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved (a)                    (b)

|  | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved ||||||  Type ||
| $B_1$ | FOD Support Data ||||||||

APPARATUS AND METHOD FOR DETECTING FOREIGN OBJECT IN WIRELESS POWER TRANSMISSION SYSTEM

CROSS-REFERENCE TO RELATED APPLICATIONS

This application is the National Stage filing under 35 U.S.C. 371 of International Application No. PCT/KR2019/010321, filed on Aug. 13, 2019, which claims the benefit of earlier filing date and right of priority to Korean Application No. 10-2018-0097237, filed on Aug. 21, 2018, the contents of which are all hereby incorporated by reference herein in their entirety.

BACKGROUND OF THE DISCLOSURE

Field of the Disclosure

The present disclosure relates to a wireless power transmission system and, more particularly, to an apparatus and a method for performing foreign object detection in a wireless power transmission system.

Related Art

Wireless power transmission technology is a technology designed for wirelessly delivering power between a power source and an electronic device. For example, wireless power transmission technology allows people to charge a battery of a wireless user equipment such as a smartphone or a tablet PC by simply placing the wireless user equipment on a wireless charging pad, thereby providing mobility, convenience, and safety much better than experienced in a wired charging environment using a conventional wired charging connector. The wireless power transmission technology is receiving a great deal of attention from various fields such as consumer appliances, industrial apparatuses, military apparatuses, automobiles, infrastructure, and medical appliances as a means for replacing the conventional wired power transmission environment.

In a power supply method via terminal, as long as a terminal connection is well-established between a charger and a user equipment, chances are low that an obstacle such as a foreign object hindering the charging process is present between the charger and the user equipment. On the other hand, due to the non-contact charging characteristic of a wireless power transmission system, an unnecessary foreign object may be inserted between a wireless power receiver and a wireless power transmitter during the charging process of the wireless power transmission system. When a foreign object, such as a metal, is located between the wireless power transmitter and the wireless power receiver, a problem may occur that not only power transmission is not performed smoothly because of the foreign object but also the apparatuses are damaged or exploded from overload due to the foreign object and overheating of the foreign object. To solve this, various foreign object detection methods are introduced, but foreign object detection may not be correctly performed due to individual characteristic differences of wireless power receivers. Furthermore, seriousness of foreign object detection error increases as a power level increases as in rapid wireless charging. Accordingly, an apparatus and method for improving accuracy and reliability of foreign object detection in spite of individual characteristics of wireless power receivers are required.

SUMMARY

An object of the present disclosure is to provide an apparatus and method for transmitting wireless power and an apparatus and method for receiving wireless power for improving reliability and accuracy of foreign object detection in a wireless power transmission system providing an extended charging area.

Another object of the present disclosure is to provide an optimal Q factor that guarantees reliable foreign object detection in a wireless power transmission system.

Still another object of the present disclosure is to provide an apparatus and method for transmitting wireless power and an apparatus and method for receiving wireless power for performing foreign object detection on the basis of an optimal Q factor in a wireless power transmission system.

According to one aspect of the present disclosure, a method for receiving, by a wireless power receiver, wireless power from a wireless power transmitter based on foreign object detection in a wireless power transmission system is provided. The method includes: receiving a digital ping form the wireless power transmitter; transmitting an identification and configuration packet to the wireless power transmitter; transmitting a foreign object detection (FOD) status packet including a reference Q factor value $Q'_{report}$ of the wireless power receiver to the wireless power transmitter; and receiving wireless power by magnetic coupling from the wireless power transmitter on the basis of a foreign object detection result of the wireless power transmitter based on the reference Q factor value. Here, the reference Q factor value may be a Q factor of a reference wireless power transmitter with respect to the wireless power receiver in a specific charging radius when a foreign object is not present nearby, and the reference Q factor value may be equal to or greater than a minimum reference Q factor value Q factor value $Q_{report\_min}$ required within the specific charging radius for an arbitrary wireless power receiver compatible with the reference wireless power transmitter.

In one aspect, when a Q factor value when a reference Q factor value $Q_{report}$ of the reference wireless power transmitter with respect to the arbitrary wireless power receiver when a foreign object is not present nearby is identical to a Q factor value $Q_{RX,RFO}$ of the reference wireless power transmitter with respect to the arbitrary wireless power receiver when a representative foreign object (RFO) is present nearby is a threshold Q factor value $Q_{report,0X}$ at which the representative foreign object is detectable, the minimum reference Q factor value may be defined on the basis of the threshold Q factor value.

In another aspect, the minimum reference Q factor value may be defined as a value obtained by correcting the threshold Q factor value by a Q factor measurement error.

In another aspect, the threshold Q factor value may be a value within a range of 22 to 23, the Q factor measurement error may be 10% of the threshold Q factor value, and the minimum reference Q factor value may be defined as a value within a range of 24 to 26, based on that the specific charging radius is about 5 mm, and the threshold Q factor value may be a value within a range of 33 to 34, the Q factor measurement error may be 10% of the threshold Q factor value, and the minimum reference Q factor value may be defined as a value within a range of 37 to 38, based on that the specific charging radius is about 10 mm.

In another aspect, the threshold Q factor value may be 22.2 and the minimum reference Q factor value may be a value within a range of 24.7 to 25, based on that the specific charging radius is about 5 mm.

In another aspect, the threshold Q factor value may be 33.3 and the minimum reference Q factor value may be a value within a range of 37.1 to 38, based on that the specific charging radius is about 10 mm.

In another aspect, the representative foreign object may be a representative foreign object that maximizes the threshold Q factor value among various types of representative foreign objects.

According to another aspect of the present disclosure, a method for transmitting, by a wireless power transmitter, wireless power to a wireless power receiver based on foreign object detection in a wireless power transmission system is provided. The method includes: transmitting a digital ping to the wireless power receiver; receiving an identification and configuration packet from the wireless power receiver; receiving a foreign object detection status packet indicating a reference Q factor value $Q'_{report}$ of the wireless power receiver from the wireless power receiver; performing foreign object detection based on the reference Q factor value; and transmitting wireless power by magnetic coupling to the wireless power receiver on the basis of a result of the foreign object detection.

Here, the reference Q factor value may be a Q factor of a reference wireless power transmitter with respect to the wireless power receiver in a specific charging radius when a foreign object is not present nearby, and the reference Q factor value may be equal to or greater than a minimum reference Q factor value $Q_{report\_min}$ required within the specific charging radius for an arbitrary wireless power receiver compatible with the reference wireless power transmitter.

In one aspect, when a Q factor value when a reference Q factor value $Q_{report}$ of the reference wireless power transmitter with respect to the arbitrary wireless power receiver when a foreign object is not present nearby is identical to a Q factor value $Q_{RX,RFO}$ of the reference wireless power transmitter with respect to the arbitrary wireless power receiver when a representative foreign object (RFO) is present nearby is a threshold Q factor value $Q_{report,OX}$ at which the representative foreign object is detectable, the minimum reference Q factor value may be defined on the basis of the threshold Q factor value.

In another aspect, the minimum reference Q factor value may be defined as a value obtained by correcting the threshold Q factor value by a Q factor measurement error.

In another aspect, the threshold Q factor value may be a value within a range of 22 to 23, the Q factor measurement error may be 10% of the threshold Q factor value, and the minimum reference Q factor value may be defined as a first reference Q factor value within a range of 24 to 26, based on that the specific charging radius is about 5 mm, and the threshold Q factor value may be a value within a range of 33 to 34, the Q factor measurement error may be 10% of the threshold Q factor value, and the minimum reference Q factor value may be defined as a second reference Q factor value within a range of 37 to 38, based on that the specific charging radius is about 10 mm.

In another aspect, the method may further include measuring a Q factor value, wherein the transmitting of the wireless power may be performed on the basis of a result of comparison between the measured Q factor value and the first reference Q factor value and the second reference Q factor value.

In another aspect, the transmitting of the wireless power may include: transmitting the wireless power based on that the measured Q factor value is greater than the second reference Q factor value; entering a ping phase based on that the measured Q factor value is equal to or less than the first reference Q factor value; and displaying an alarm message with respect to a foreign object based on that the measured Q factor value is equal to or less than the second reference Q factor value and greater than the first reference Q factor value.

It is possible to improve accuracy and reliability of foreign object detection in an extended charging area in spite of individual characteristics of wireless power receivers

BRIEF DESCRIPTION OF THE DRAWINGS

FIG. 3*b* shows an example of a WPC NDEF in a wireless power transfer system.

FIG. 10 is a structure of a sync pattern according to an exemplary embodiment of the present disclosure.

FIG. 20 illustrates a structure of an FOD status packet according to an example.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
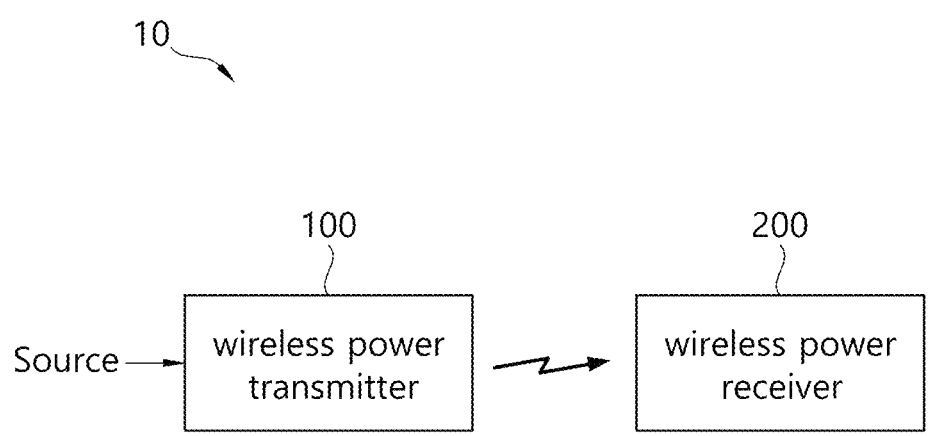
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
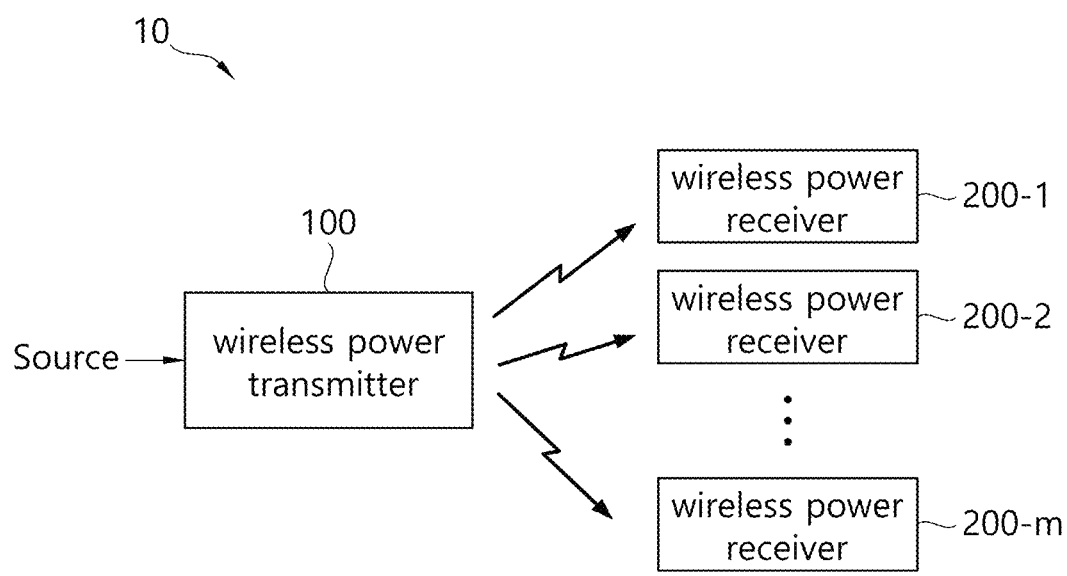
FIG. 2 is a block diagram of a wireless power system (10) according to another exemplary embodiment of the present disclosure.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, ..., 200-M). Most particularly, in case the wireless power transfer (or transmission) is performed by using a magnetic resonance method, one wireless power transmitter (100) may transfer power to multiple wireless power receivers (200-1, 200-2, ..., 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
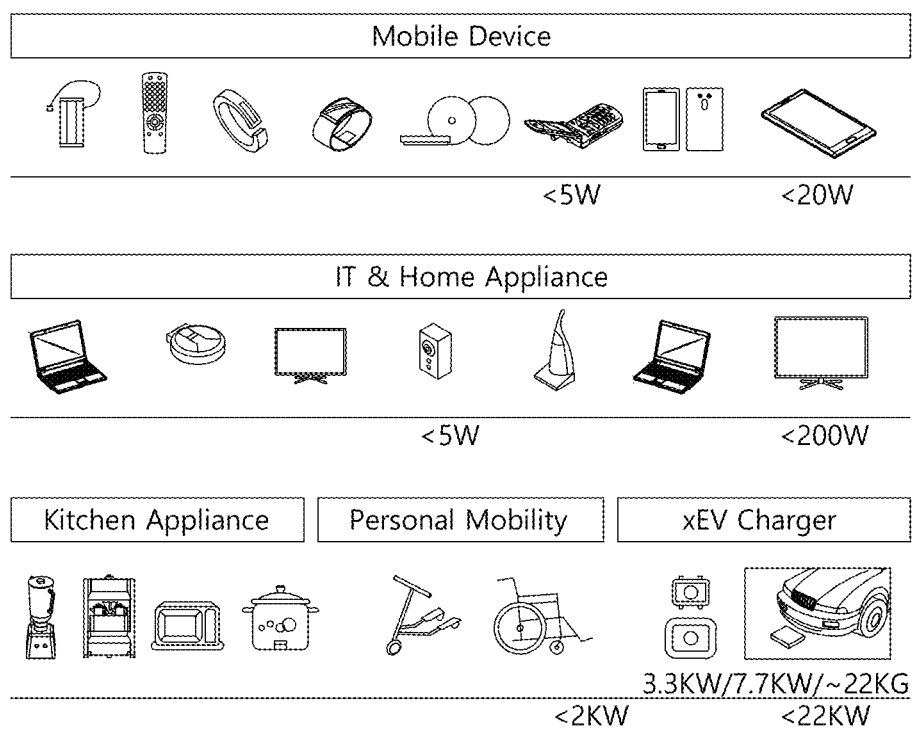
FIG. 3*a* shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than SW and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than SW. The application of PC-1 includes wearable devices, such as smart watches.

The PC0 standard relates to wireless power transmitters and receivers providing a guaranteed power of SW. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF). For example, the WPC NDEF may include an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
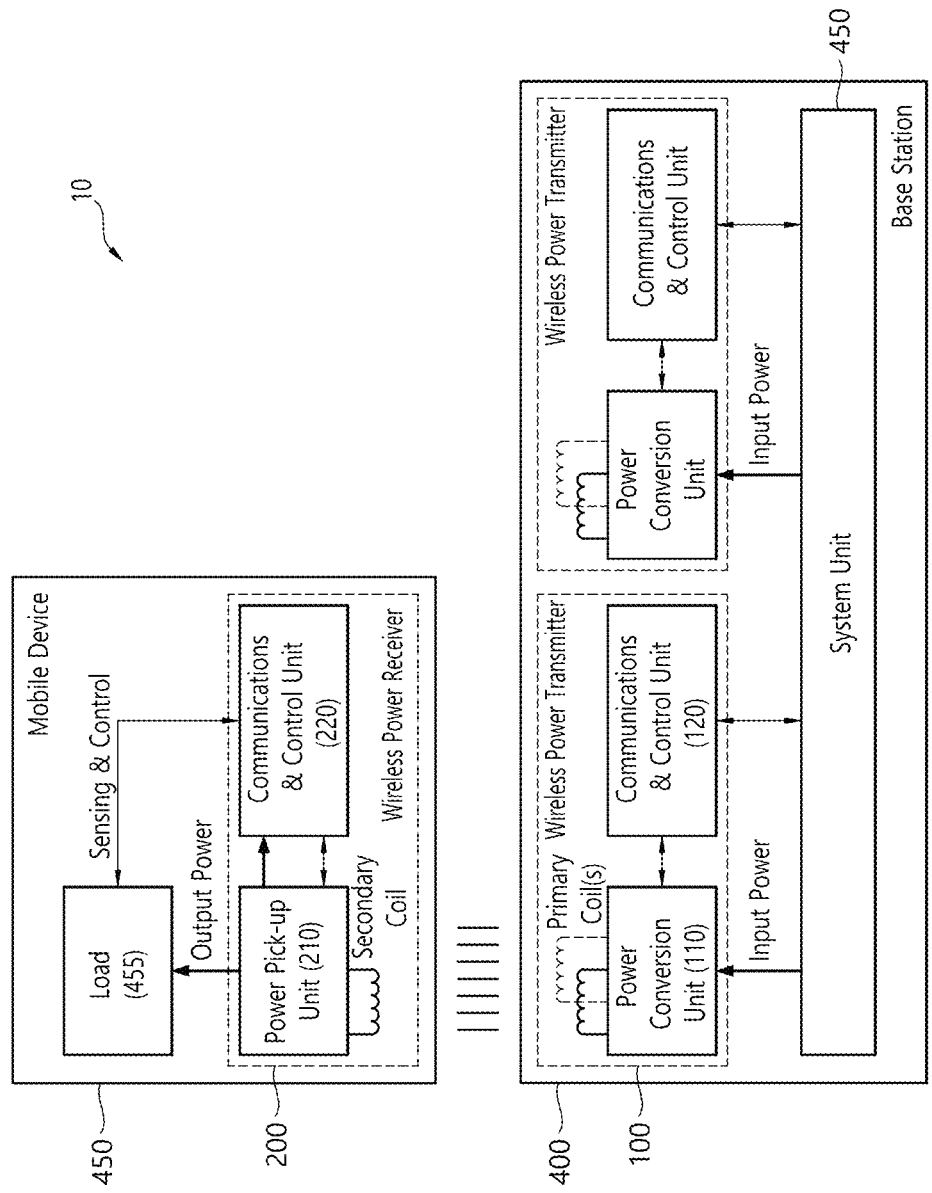
FIG. 4*a* is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (TB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module uses a frequency band different from the operating frequency of the IB, and may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading communication information in the operating frequency used for wireless power transmission and by transmitting the communication information through the secondary coil or by receiving the operating frequency carrying the communication information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module uses an operating frequency of wireless power transmission and may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
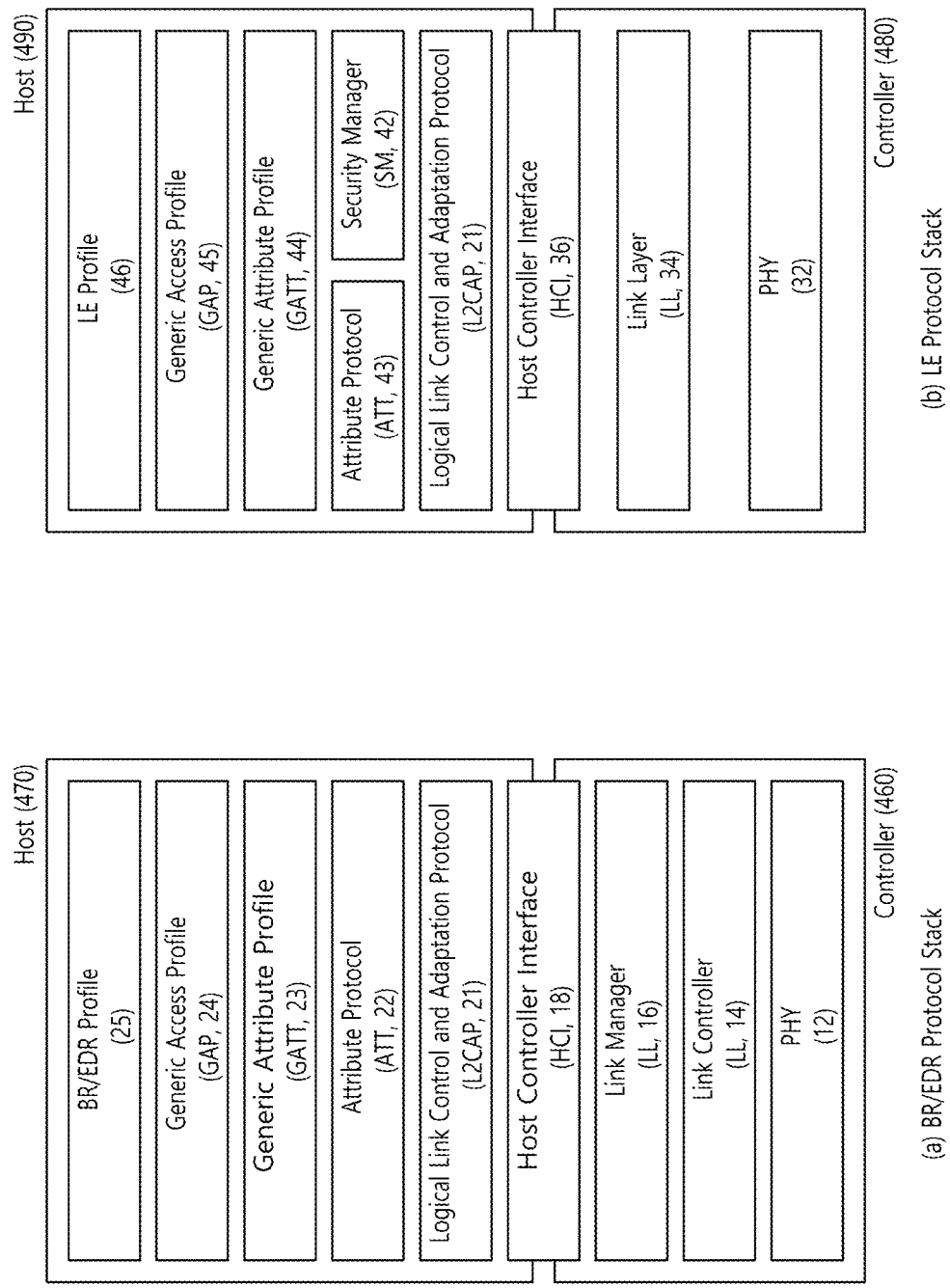
FIG. 4*b* is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4b.

FIG. 4b is a diagram illustrating an example of a Bluetooth communication architecture to which an embodiment according to the present disclosure may be applied.

Referring to FIG. 4b, (a) of FIG. 4b shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4b, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4b, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

The design directions of a BLE GATT profile in relation with wireless power transmission.

1. A communication physical layer of WPC may be replaced from in-band communication to out-band communication.

2. If BLE is adopted as out-band communication, the BLE GATT profile shall be designed so that required messages in each phase (or step) can be transmitted and received from a WPC state machine.

3. In in-band communication, the longest message is 8 bytes. Based on the characteristics of in-band communication, the bit per sec (bps) is low, since the communication performance may not be excellent due to interference, the system may be instable when transmitting and receiving large-sized message at once (i.e., in one session). Relatively, a BLE having a high bps may carry 20 Bytes in a message. Therefore, the required information may be loaded to fit 20 Bytes per phase.

4. Since only the communication physical layer of WPC is transitioned (or shifted) from in-band communication to out-band communication, no change shall be made in a message transmitting/receiving sequence that has used the previously used (or old) in-band communication. Therefore, the design shall be made so that messages can be transmitted and received in a similar way as the WPC state machine.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4a, The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
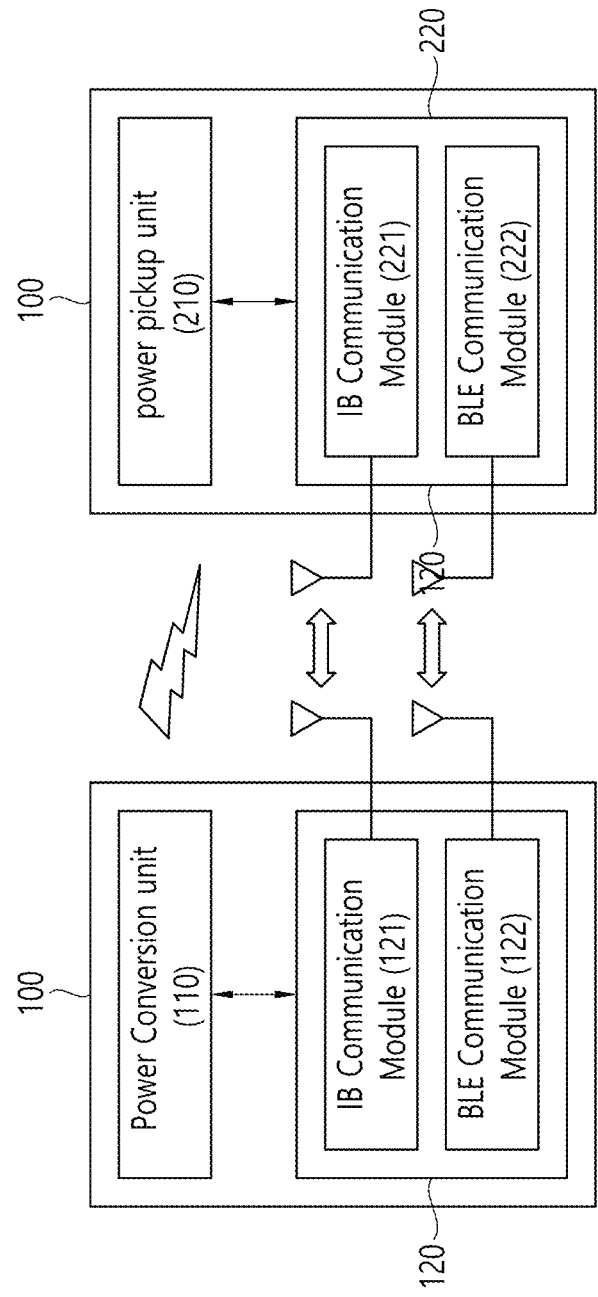
FIG. 4*c* is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4c.

FIG. 4c is a block diagram illustrating a wireless power transfer system using BLE communication according to an example.

Referring to FIG. 4c, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4b. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
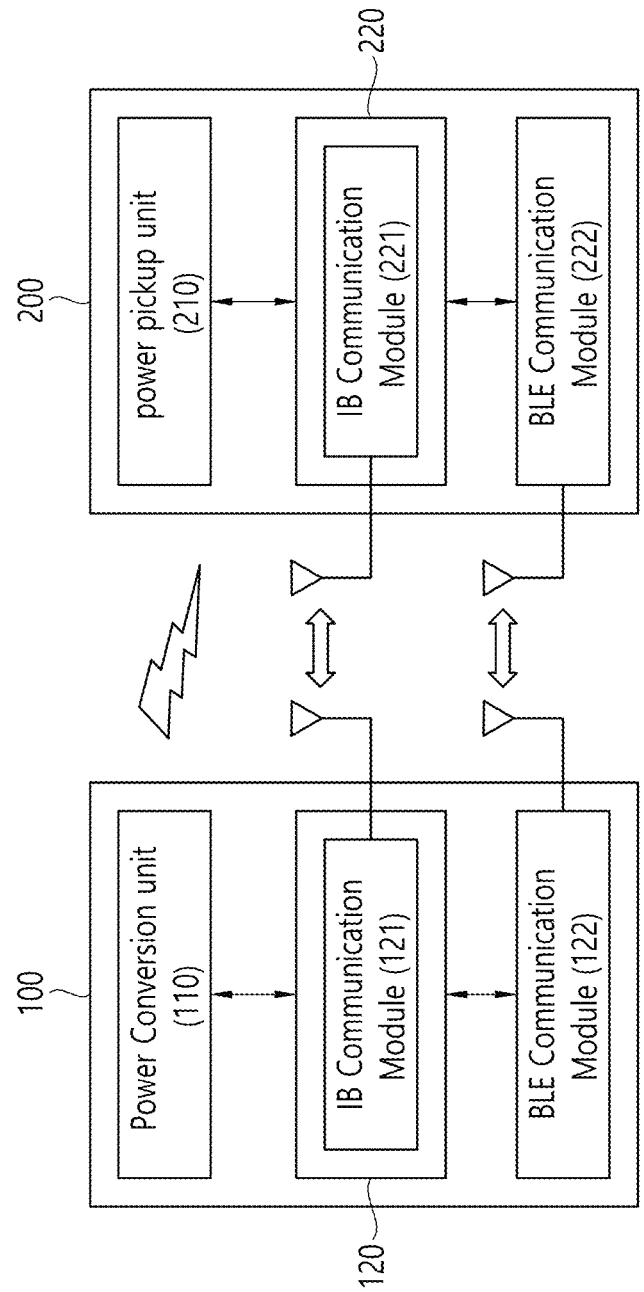
FIG. 4*d* is a block diagram illustrating a wireless power transfer system using BLE communication according to another example.

Referring to FIG. 4d, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
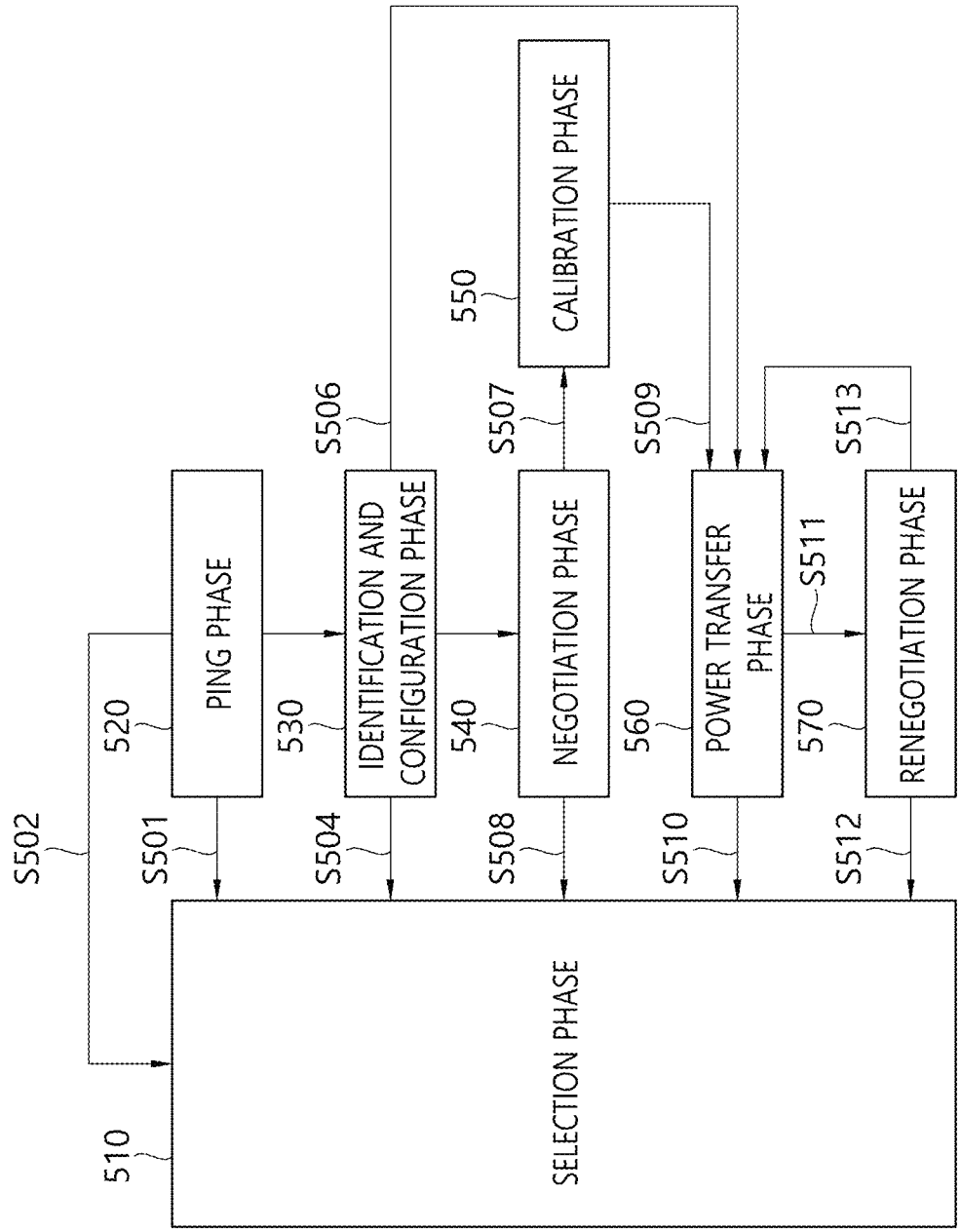
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
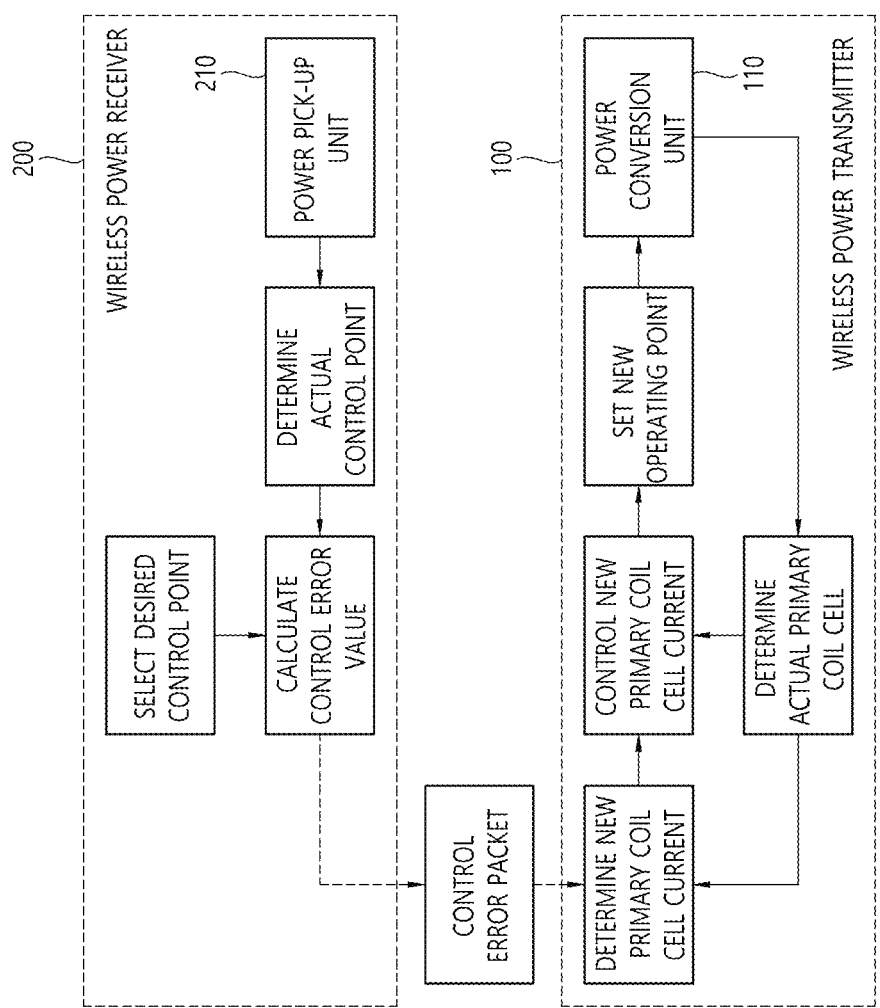
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
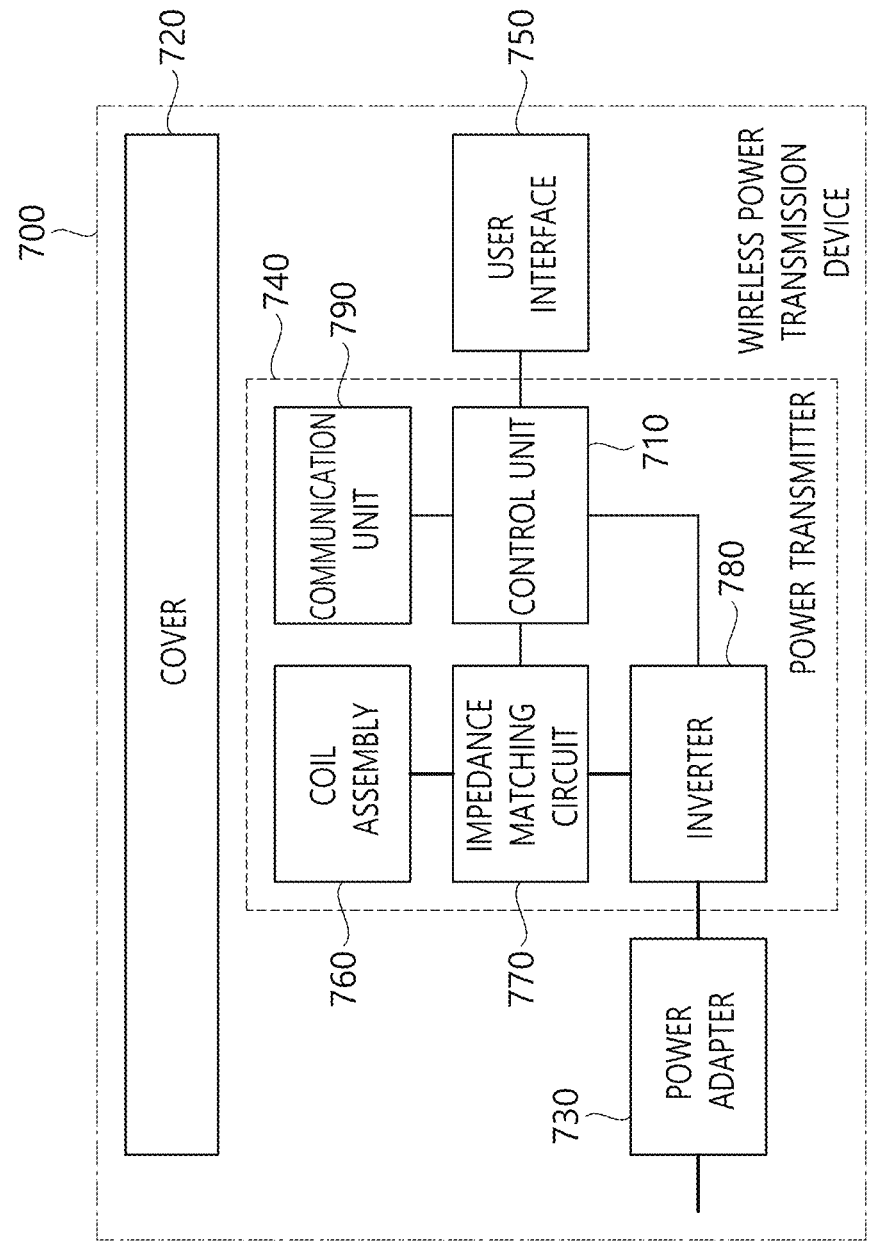
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
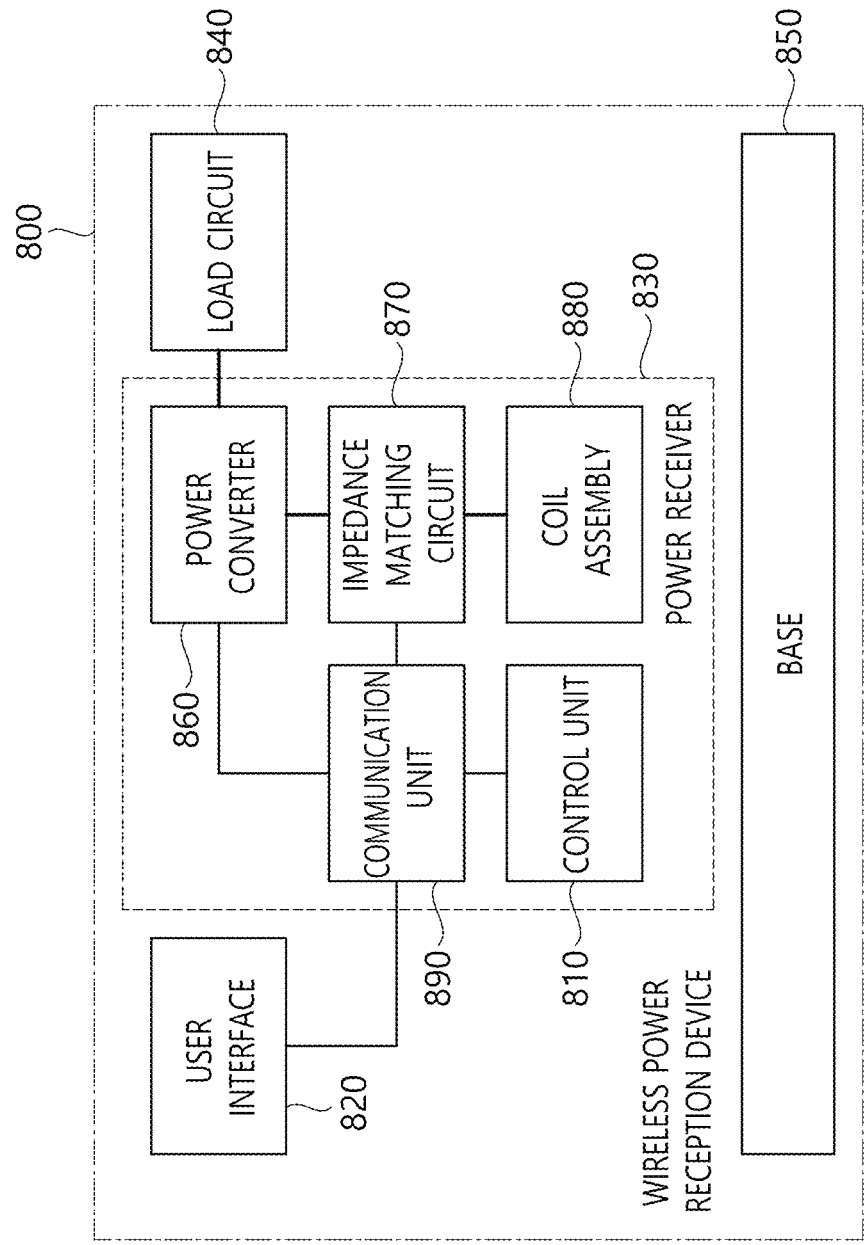
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
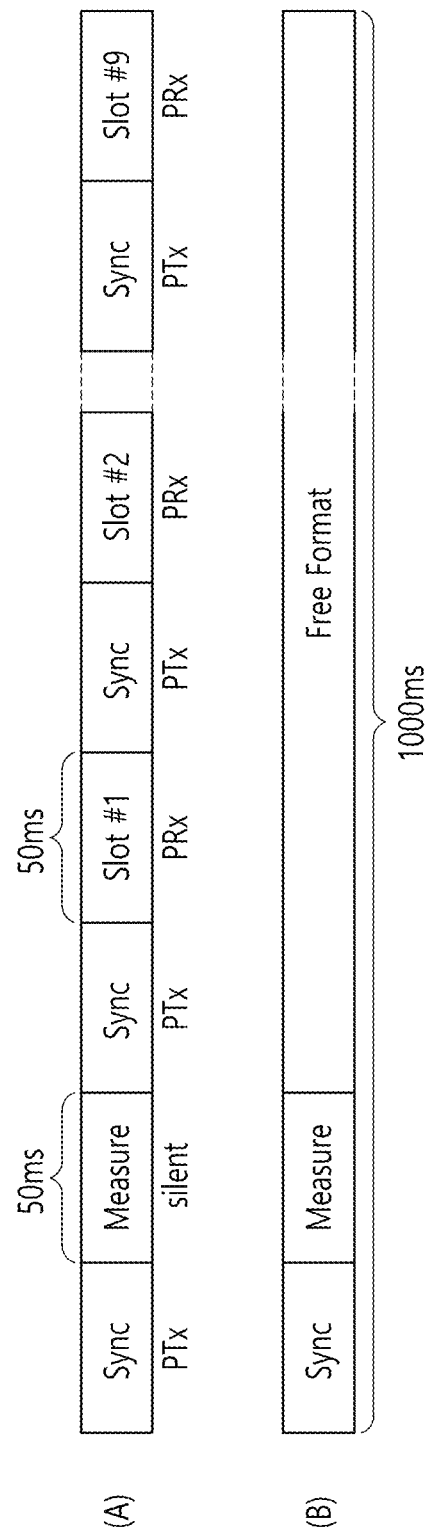
FIG. 9 shows a communication frame structure according to an exemplary embodiment of the present disclosure.

FIG. 9 shows a communication frame structure according to an exemplary embodiment of the present disclosure. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present disclosure.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

Figure 11:
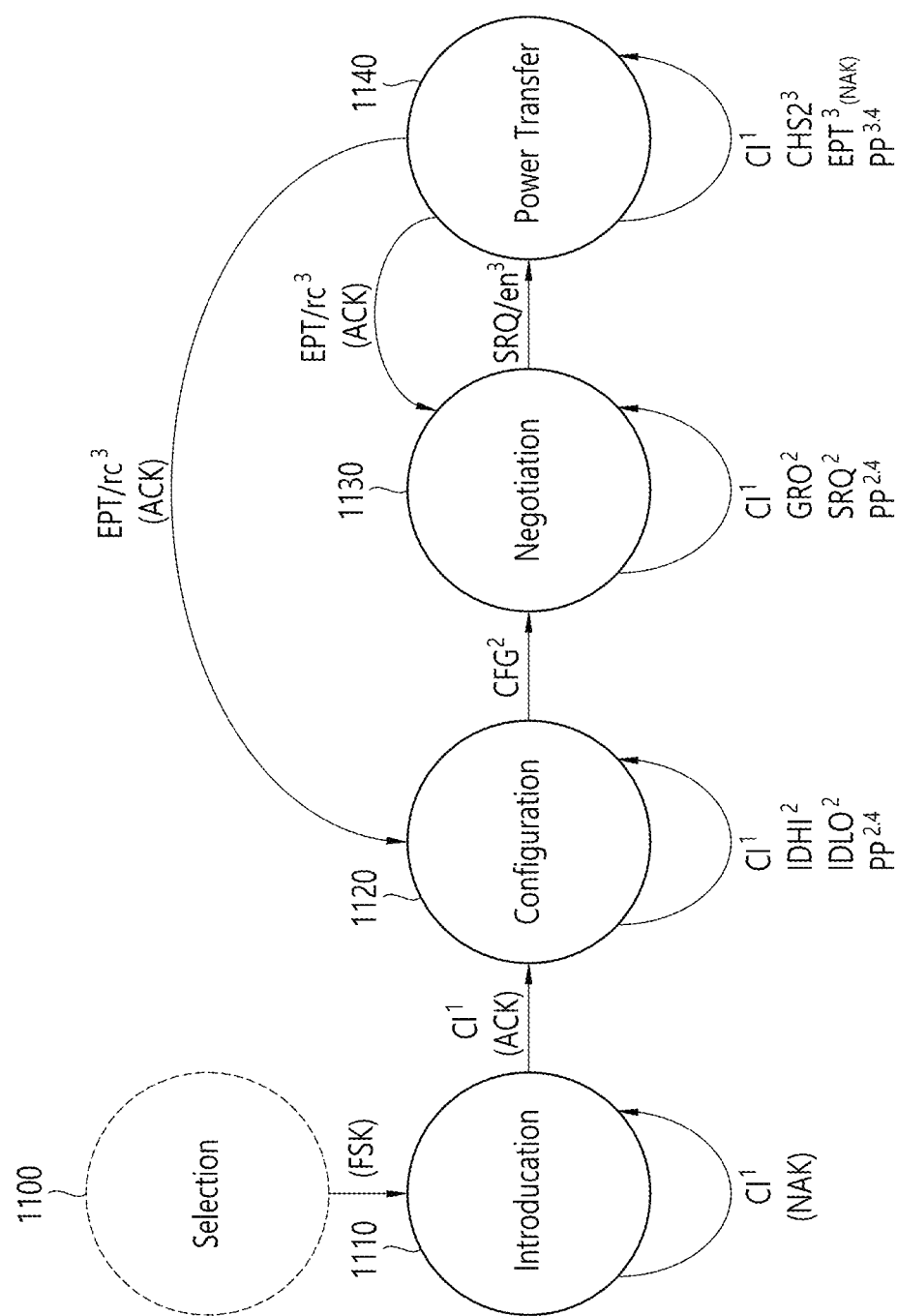
FIG. 11 shows operation statuses of a wireless power transmitter and a wireless power receiver in a shared mode according to an exemplary embodiment of the present disclosure.

FIG. 11 shows operation statuses of a wireless power transmitter and a wireless power receiver in a shared mode according to an exemplary embodiment of the present disclosure.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, a wireless power transmitting apparatus and method, and a wireless power receiving apparatus and method performing foreign object detection before power transmission and determining a power transmission protocol or a level of wireless power that is to be transmitted/received, or a power transfer contract based on a result of the foreign object will be disclosed.

A foreign object may be detected by using various methods. A wireless power transmitting apparatus and/or receiving apparatus may perform foreign object detection during a power transmission phase and may also perform foreign object detection before the power transmission phase. Most particularly, in case of an extended power profile (EPP) or a medium power wireless power receiving apparatus, which consumes a relatively large amount of power, a function capable of performing foreign object detection during the power transmission phase as well as before the power transmission phase is needed. For example, foreign object may be detected during a negotiation phase, which is before the power transmission phase.

To this end, when the wireless power receiver reports a quality factor (Q-factor) value to the wireless power transmitter in the negotiation phase, the wireless power transmitter may determine whether a foreign object exists on the interface surface of the wireless power transmitter by using the reported quality factor. Here, the reported quality factor may be referred to as a reference Q-factor.

However, if the wireless power transmitter wrongly determines that there is still no foreign object in the negotiation phase despite the presence of a foreign object, the wireless power transmitter enters the power transfer phase, and system calibration is performed. Afterwards, the wireless power transmitter continues to transmit wireless power to the wireless power receiver based on the false detection of a foreign object, which may eventually lead to an accident such as overheating. The severity of false detection of a foreign object may be greater in the case of rapid wireless charging or medium/high power class devices. Therefore, accuracy and reliability of foreign object detection needs to be further improved for wireless power transmission systems.

A wireless power transmitter has to be designed to maximize the efficiency of wireless power transmission. Therefore, the wireless power transmitter has to be designed to not contain a friendly metal component or even if a friendly metal component is contained, the wireless power transmitter has to be designed so that the friendly metal component does not block magnetic lines of force or magnetic field paths. Meanwhile, the wireless power receiver may contain a friendly metal component. Here, a friendly metal component may mean a metallic element applied intentionally to an apparatus by the manufacturer. For example, in the case of a wireless power receiver such as a smartphone, the friendly metal component may refer to an essential part required during the manufacturing process, such as a battery or a case.

Friendly metals should be treated differently from those metals regarded as foreign objects. This is so because, if a friendly metal is determined as a foreign object, wireless power may not be supplied smoothly. Therefore, foreign object detection has to be designed based on a premise that friendly metals are distinguished from foreign objects.

It is not easy for the wireless power transmitter to distinguish a friendly metal from foreign objects. This is so because methods for applying friendly metals to the wireless power receiver differ among manufacturers and the wireless power transmitter has to distinguish the friendly metal from foreign objects for any wireless power receiver by considering diversity of the methods. To distinguish a friendly metal from foreign objects, a unique Q factor (namely, a reference Q factor) of the wireless power receiver may be used, which is measured in advance in an environment containing no foreign object in the surroundings thereof.

As an example of the wireless power receiver, Table 4 shows measurement results of reference Q factors of various mobile devices (Q factors measured when there is no foreign object nearby) and Q factors of a reference wireless power transmitter or a Test Power Transmitter (TPT) in the existence of various types of Representative Foreign Objects (RFOs).

TABLE 4

| Mobile | Q-factor measured by LCR meter | | | | |
| --- | --- | --- | --- | --- | --- |
| device | without FO | RFO#1 | RFO#2 | RFO#3 | RFO#4 |
| None | 160 | 49.5 | 37.1 | 31 | 50 |
| A | 55 | 23.7 | 24.2 | 20 | 29 |
| B | 47 | 24.2 | 25.8 | 20.1 | 29 |
| C | 46 | 24.8 | 25 | 20 | 31 |
| D | 54 | 25.7 | 25.9 | 21.1 | 32 |

TABLE 4-continued

| Mobile device | Q-factor measured by LCR meter | | | | |
|---|---|---|---|---|---|
| | without FO | RFO#1 | RFO#2 | RFO#3 | RFO#4 |
| E | 60 | 33.8 | 31.8 | 26.9 | 39.5 |
| F | 57 | 26.2 | 26.9 | 21.8 | 31 |
| G | 80 | 36 | 32.8 | 27.3 | 40.6 |
| H | 66 | 32.3 | 30 | 25.5 | 36.5 |
| I | 106 | 33.6 | 29.1 | 24.6 | 36 |
| J | 56 | 24.5 | 22.6 | 19.3 | 27.5 |
| K | 29 | 21.6 | 23.8 | 19.4 | 29 |
| L | 20 | 20.7 | 22.9 | 18.9 | 24 |
| M | 25 | 31.9 | 32.2 | 29.1 | 33 |

Referring to Table 4, in the case where no mobile device is involved (the row indicated by 'None'), the Q factor value is measured to be 160 in the case without a foreign object (without FO); the Q factor value is measured to be 49.5 in the existence of a first Representative Foreign Object (RFO #1); the Q factor value is measured to be 37.1 in the existence of a second Representative Foreign Object (RFO #2); the Q factor value is measured to be 31 in the existence of a third Representative Foreign Object (RFO #3); and the Q factor value is measured to be 50 in the existence of a fourth Representative Foreign Object (RFO #4). Here, the representative foreign object may be a representative foreign object for the compliance test as specified in the WPC standard. Meanwhile, in the cases of mobile device "K", "L", and "M", it was observed that Q factor values (Qw/o FO) in the absence of a foreign object are larger than or equal to the Q factor values in the presence of a representative foreign object (QRFO #n). Since a foreign object is known to reduce the Q factor, the observation above that the Q factor is increased on the contrary due to a foreign object may cause a serious problem degrading reliability of foreign object detection.

In a case where there is no considerable difference between a Q factor value measured when a foreign object is present and a unique reference Q factor value for a wireless power receiver measured when a foreign object is not present, or in a case where the measured Q factor value is greater than the reference Q factor value even though the foreign object is present, it may be difficult to determine presence or absence of a foreign object or detection may be impossible. That is, there is a limit to the accuracy and reliability in foreign object detection of a wireless power transmitter when friendly metals are considered. In this case, other determination factors need to be considered or presence or absence of a foreign object needs to be determined using other methods. Accordingly, an apparatus and method for improving the accuracy and reliability of foreign object detection are required.

Hereinafter, results of experiments and simulations performed to design an optimal reference Q factor according to the present embodiment will be disclosed. The optimal reference Q factor is a minimum reference Q factor used to detect foreign objects independently of mobile devices and/or types and characteristics of foreign objects.

For optimal reference Q factor design according to the present embodiment, four Q factor values were preliminarily measured. One is a Q factor QTPT-QFACTOR that can be obtained from a reference wireless power transmitter when both a foreign object and a wireless power receiver are not present nearby. Another is a Q factor QRFO that can be obtained from the reference wireless power transmitter when there is no wireless power receiver and a representative foreign object is present nearby. Another is a Q factor Qw/RX with respect to a wireless power receiver when the wireless power receiver is placed on the reference wireless power transmitter and there is no representative foreign object nearby. Another is a Q factor QRX+RFO that can be obtained from the reference wireless power transmitter when a wireless power receiver is placed on the reference wireless power transmitter and a representative foreign object is present nearby.

First, the Q factor QTPT-QFACTOR that can be obtained from the reference wireless power transmitter when both a foreign object and a wireless power receiver are not present nearby is derived.

Figure 12:
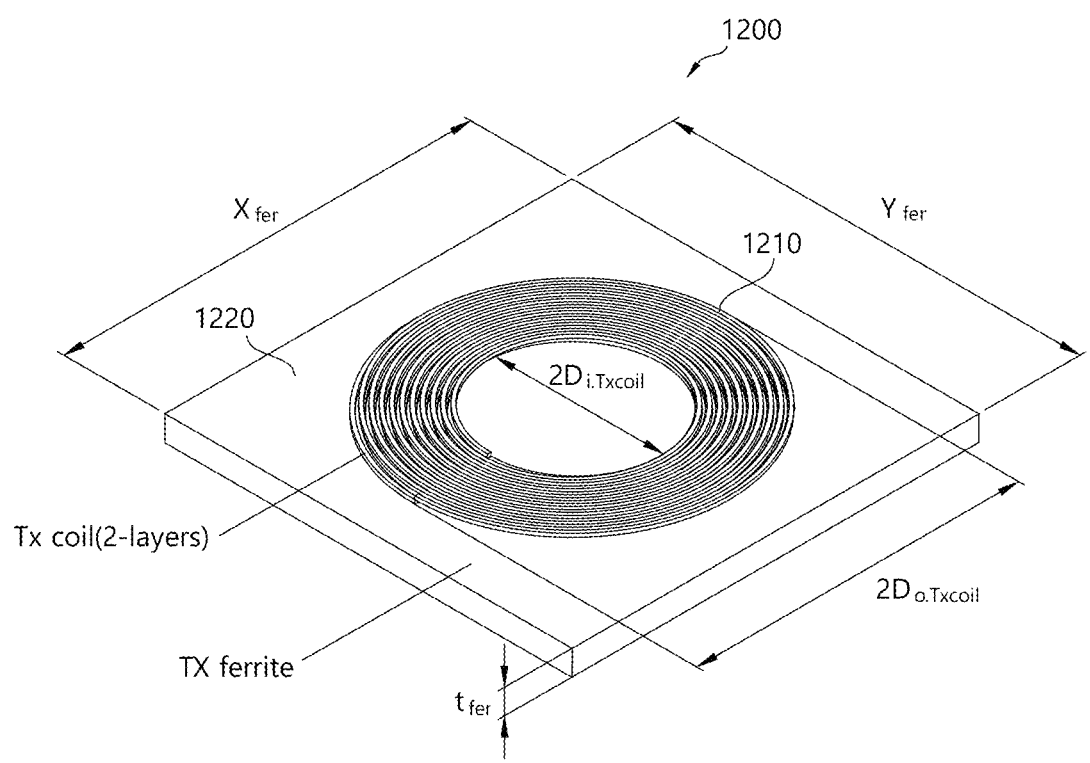
FIG. 12 is a perspective view illustrating a primary coil and a shielding unit of a reference wireless power transmitter used in experiments of the present embodiment.

FIG. 12 is a perspective view illustrating a primary coil and a shielding unit of a reference wireless power transmitter used in experiments of the present embodiment.

Referring to FIG. 12, a power transmitting unit 1200 of the reference wireless power transmitter includes a primary coil 1210 and a shielding unit 1220.

The primary coil 1210 may be wound in a planar spiral pattern and disposed on one surface of the shielding unit 1220. A litz coil may be used as the primary coil 1210. Physical parameters of the primary coil 1210 are shown in Table 5 and physical parameters of the shielding unit 1220 are shown in Table 6. The primary coil 1210 and the shielding unit 1220 model TPT-QFACTOR, and physical parameter values thereof conform to physical parameter values with respect to TPT-QFACTOR defined in WPC standard ver1.2.3.

TABLE 5

| Physical parameter | Unit | Symbol |
|---|---|---|
| Outer diameter/2 | mm | $D_{o\_Txcoil}$ |
| Inner diameter/2 | mm | $D_{i\_Txcoil}$ |
| Thickness | mm | $t_{Txcoil}$ |
| Number of turn | Turn | $N_{Txcoil}$ |

TABLE 6

| Physical parameter | Unit | Symbol |
|---|---|---|
| x-axis length of shielding unit | mm | $x_{fer}$ |
| y-axis length of shielding unit | mm | $y_{fer}$ |
| Thickness of shielding unit | mm | $t_{fer}$ |

When an input signal at a frequency of 100 kHz is applied to the power transmitting unit 1200 having the aforementioned physical parameter values, a measured self-inductance LREF and reference Q factor Qref are as shown in Table 7.

TABLE 7

| Symbol | Standards | Measurement result | Simulation result |
|---|---|---|---|
| $L_{REF}$ (uH) | 24.8 ± 1 | — | 25.8 |
| $Q_{ref}$ | 157.6 ± 2%~158.6 ± 2% | 160 | 158.3 |

It can be ascertained from Table 7 that a Q factor value QTPT-QFACTO that can be obtained from the reference wireless power transmitter is 160.

Next, the Q factor QRFO that can be obtained from the reference wireless power transmitter when there is no wireless power receiver and a representative foreign object is present nearby is derived.

Figure 13:
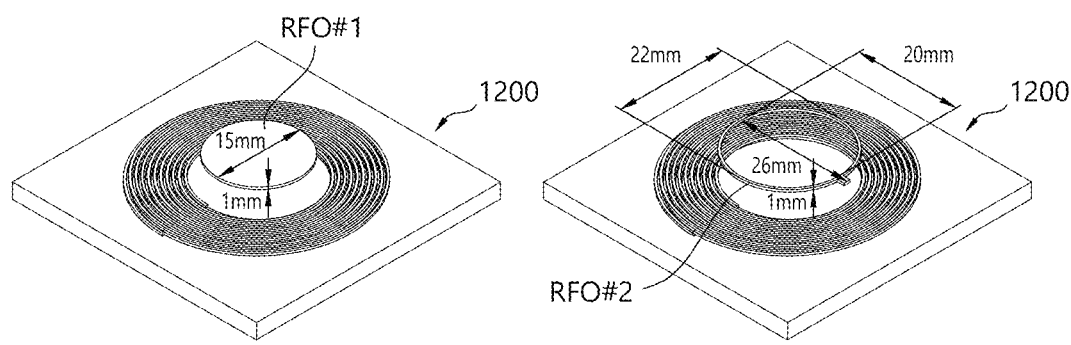
FIG. 13 is a perspective view illustrating the primary coil and the shielding unit of the reference wireless power transmitter, and four representative foreign objects used in experiments of the present embodiment.
Figure 13:
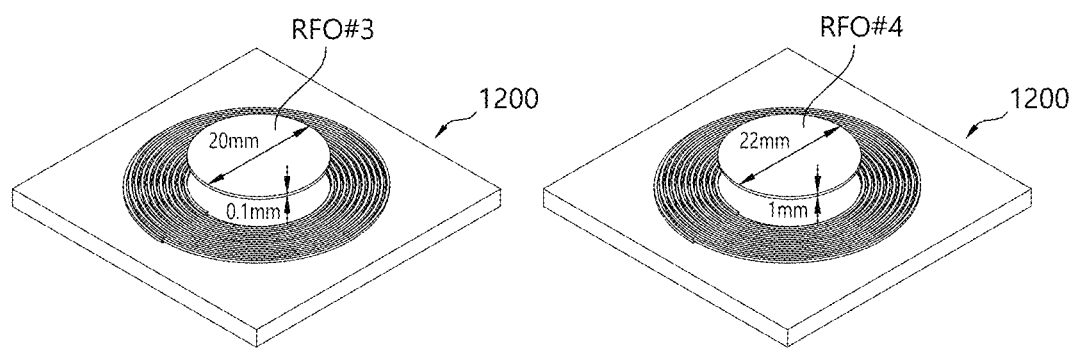

FIG. 13 is a perspective view illustrating the primary coil and the shielding unit of the reference wireless power transmitter, and four representative foreign objects used in experiments of the present embodiment.

Referring to FIG. 13, a representative foreign object RFO #1 used in experiment (a) is a steel disk having a diameter of 15 mm and a thickness of 1 mm, a representative foreign object RFO #2 used in experiment (b) is an aluminum ring having an outer diameter of 22 mm, an inner diameter of 20 mm, a thickness of 1 mm, and a maximum outer diameter of 26 mm, a representative foreign object RFO #3 used in experiment (c) is an aluminum foil having a diameter of 20 mm and a thickness of 0.1 mm, and a representative foreign object RFO #4 used in experiment (d) is an aluminum disk having a diameter of 22 mm and a thickness of 1 mm. In the experiments, Q factors were measured in a state in which the center of each representative foreign object was adjusted to correspond to the center of the reference wireless power transmitter 1200 having a vertical distance of 2.5 mm+0.5 mm between the centers, as illustrated in lower parts of (a), (b), (c), and (d). Here, 2.5 mm is a distance between the top of the primary coil and an interface surface of the reference wireless power transmitter, and 0.5 mm is a distance between each representative foreign object and the bottom of a frame.

Q factors QRFO measured when a 100 kHz input signal is applied to each representative foreign object are shown in Table 8.

TABLE 8

| Q factor ($Q_{RFO}$) | Measurement results | Simulation results |
| --- | --- | --- |
| RFO#1 | 49.5 | 49.5 |
| RFO#2 | 37.1 | 34.4 |
| RFO#3 | 31 | 27.1 |
| RFO#4 | 50 | 51 |

Figure 14:
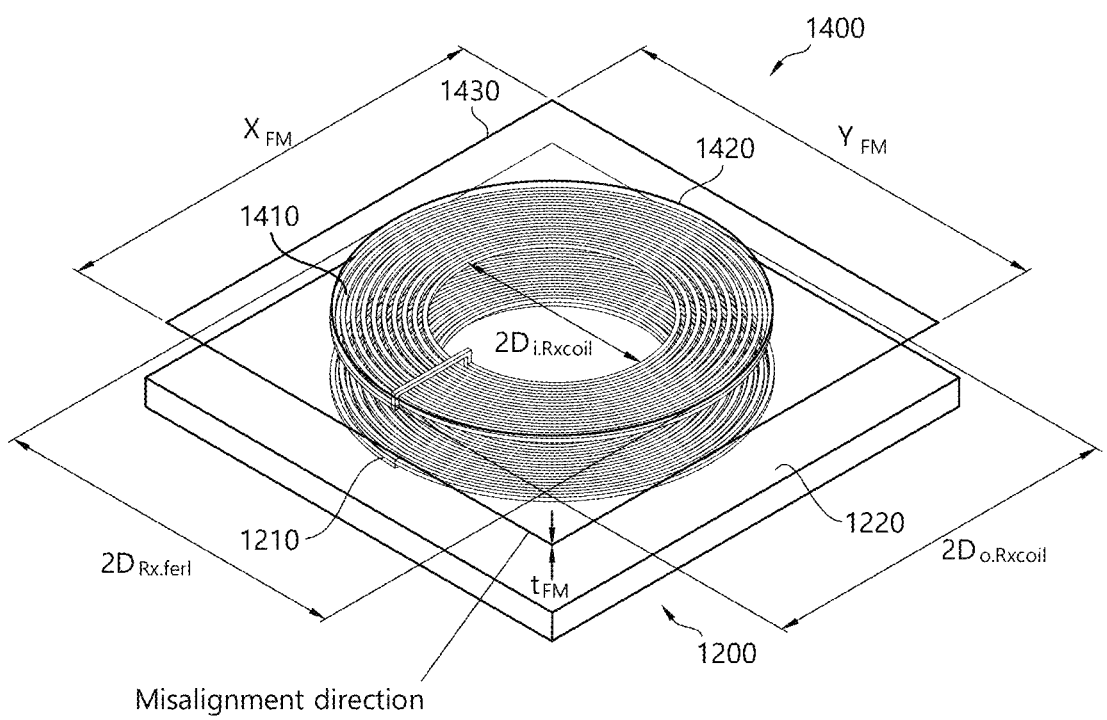
FIG. 14 is a perspective view illustrating the primary coil and the shielding unit of the reference wireless power transmitter, and a secondary coil, a shielding unit, and a metal case member of a reference wireless power receiver used in experiments of the present embodiment.
Figure 14:
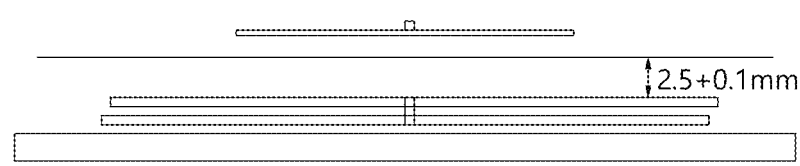

Next, a Q factor Qw/RX that can be obtained from the reference wireless power transmitter when a wireless power receiver is placed on the reference wireless power transmitter and there is no representative foreign object nearby is derived. FIG. 14 is a perspective view illustrating the primary coil and the shielding unit of the reference wireless power transmitter, and a secondary coil, a shielding unit, and a metal case member of a reference wireless power receiver used in experiments of the present embodiment.

Referring to FIG. 14, the power transmitting unit 1200 of the reference wireless power transmitter includes the primary coil 1210 and the shielding unit 1220, which is the same as the configuration of FIG. 12.

A power receiving unit 1400 of the reference wireless power receiver includes a secondary coil 1410, a shielding unit 1420, and a metal case member 1430 of a mobile device. The secondary coil 1410 may be wound in a planar spiral pattern and disposed on one surface of the shielding unit 1420. A litz coil may be used as the secondary coil 1410. Physical parameters of the secondary coil 1410 in FIG. 14 are shown in FIG. 9, physical parameters of the shielding unit 1420 are shown in FIG. 10, and physical parameters of the metal case member 1430 are shown in FIG. 11.

TABLE 9

| Physical parameter | Unit | Symbol |
| --- | --- | --- |
| Outer diameter/2 | mm | $D_{o\_Rxcoil}$ |
| Inner diameter/2 | mm | $D_{i\_Rxcoil}$ |

TABLE 9-continued

| Physical parameter | Unit | Symbol |
| --- | --- | --- |
| Width of secondary coil | mm | $w_{Rxcoil}$ |
| Thickness | mm | $t_{Rxcoil}$ |
| Number of turn | Turn | $N_{Rxcoil}$ |
| Distance between turns of secondary coil | mm | $p_{Rxcoil}$ |

TABLE 10

| Physical parameter | Unit | Symbol |
| --- | --- | --- |
| Diameter of shielding unit | mm | $D_{Rxfer}$ |
| Thickness of shielding unit | mm | $t_{Rxfer}$ |

TABLE II

| Physical parameter | Unit | Symbol |
| --- | --- | --- |
| x-axis length of friendly metal case | mm | $x_{FM}$ |
| y-axis length of friendly metal case | mm | $y_{FM}$ |
| Thickness of friendly metal case | Um | $t_{FM}$ |

Figure 15:
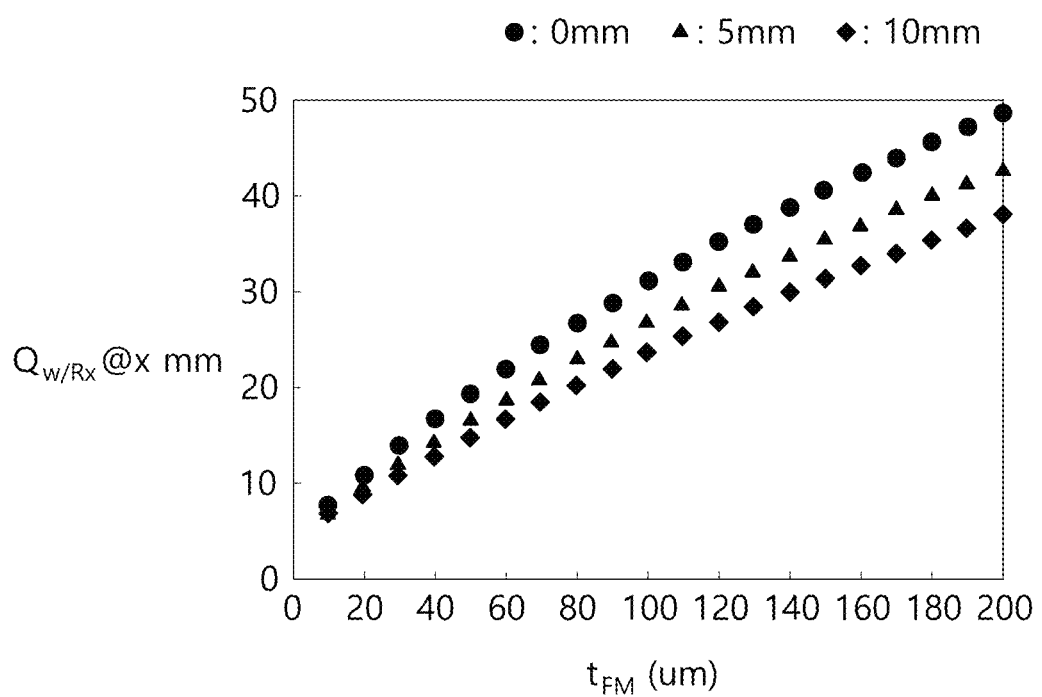
FIG. 15 illustrates simulation results according to the embodiment of FIG. 14.

Here, the secondary coil and the shielding unit used in experiments of the present disclosure are included in an iPhone X. In addition, the horizontal and vertical lengths of the metal case member 1430 are 50 mm. When the wireless power transmitter including a friendly metal case is placed on the power transmitting unit 1200 having the aforementioned physical parameters in a state in which a 100 kHz input signal is applied to the power transmitting unit 1200, a Q factor (TPT-Q factor) of the wireless power transmitter decreases. The Q factor Qw/RX@xmm reduced by the wireless power receiver in this manner is as illustrated in FIG. 15. FIG. 15 is simulation results according to the embodiment of FIG. 14.

Referring to FIG. 15, "@xmm" represents that the center of the secondary coil of the wireless power receiver is x mm from the center of the reference wireless power transmitter. A reference Q factor value can be defined as a smallest value among a Q factor value when the wireless power receiver is placed on the reference wireless power transmitter, a total of four Q factor values Qw/RX@5 mm obtained by alternately placing the wireless power receiver at positions of 0° (east), 90° (north), 180° (west), and 270° (south) at a distance of 5 mm from the center, and a total of four Q factor values Qw/RX@10 mm obtained by alternately placing the wireless power receiver at positions of 0° (east), 90° (north), 180° (west), and 270° (south) at a distance of 10 mm from the center.

As can be ascertained from the results of FIG. 15, there are differences among a Q factor Qw/Rx@0 mm measured at the center of the reference wireless power transmitter, Q factor values Qw/Rx@5 mm measured at positions 5 mm from the center, and Q factor values Qw/Rx@10 mm measured at positions 10 mm from the center. Meanwhile, it can be ascertained that all of Qw/Rx@0 mm, Qw/Rx@5 mm, and Qw/Rx@10 mm increase when the thickness of the metal case increases.

Next, a Q factor QRX+RFO when a wireless power receiver is placed on the reference wireless power transmitter and a representative foreign object is present is measured to derive a final Q factor.

Figure 16:
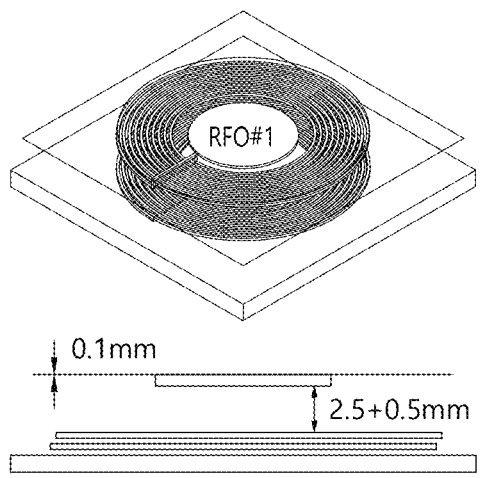
FIG. 16 is a perspective view illustrating the primary coil and the shielding unit of the reference wireless power transmitter, the secondary coil, the shielding unit, and the metal case member of the reference wireless power receiver, and representative foreign objects used in experiments of the present embodiment.
Figure 16:
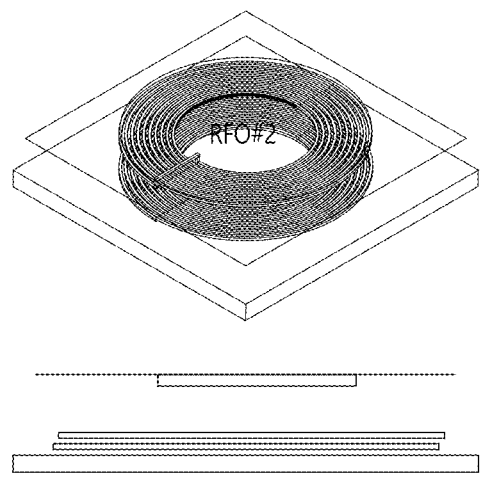
Figure 16:
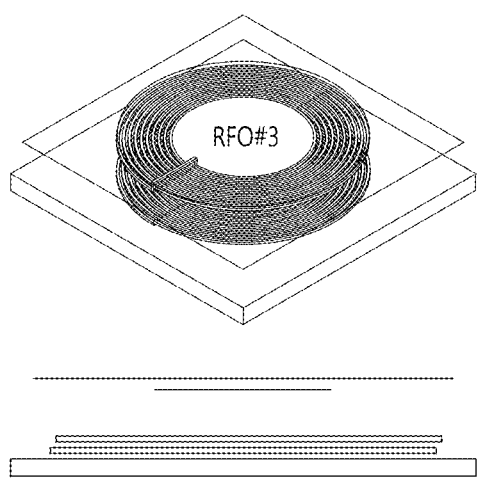
Figure 16:
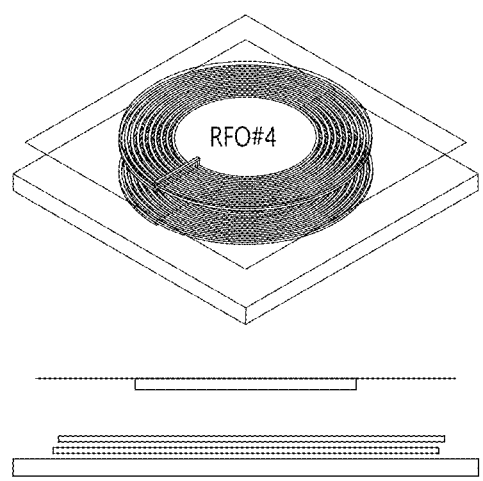

FIG. 16 is a perspective view illustrating the primary coil and the shielding unit of the reference wireless power transmitter, the secondary coil, the shielding unit, and the metal case member of the reference wireless power receiver, and representative foreign objects used in experiments of the present embodiment.

Figure 19:
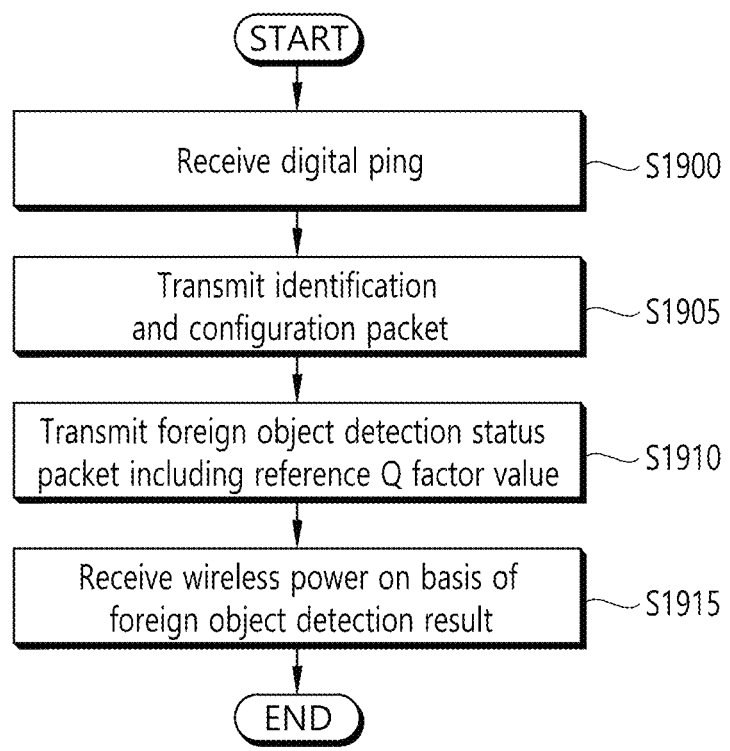
FIG. 19 is a flowchart illustrating a method of receiving, by a wireless power receiver, wireless power from a wireless power transmitter based on foreign object detection according to an embodiment.

The power transmitting unit of the reference wireless power transmitter and the reference wireless power receiver used in experiments and simulations of FIG. 16 are the same as the power transmitting unit 1200 of FIG. 12 and the wireless power receiver of FIG. 12, and foreign objects used in experimental groups of (a), (b), (c), and (d) are the same as the representative foreign objects of FIG. 13. When simulations are performed in environments of FIG. 16, results as shown in FIG. 19 can be obtained.

FIG. 17 is graphs showing results of simulations performed in the environments of FIG. 16 according to the present embodiment.

Figure 17A:
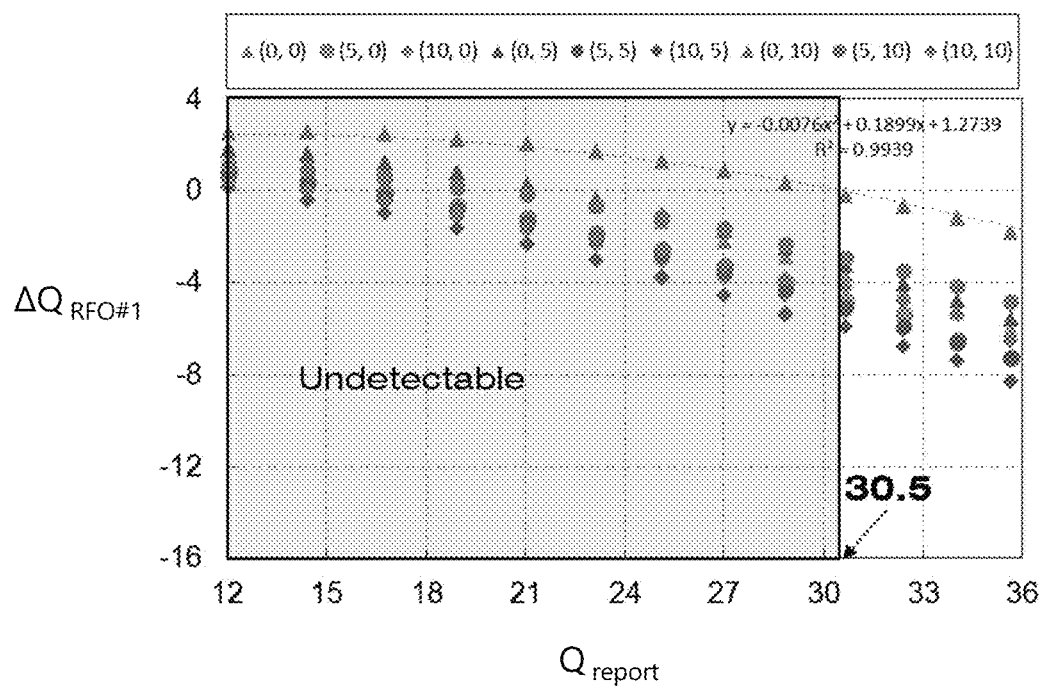
FIG. 17a to FIG. 17d are graphs showing results of simulations performed in environments of FIG. 16 according to the present embodiment.
Figure 17B:
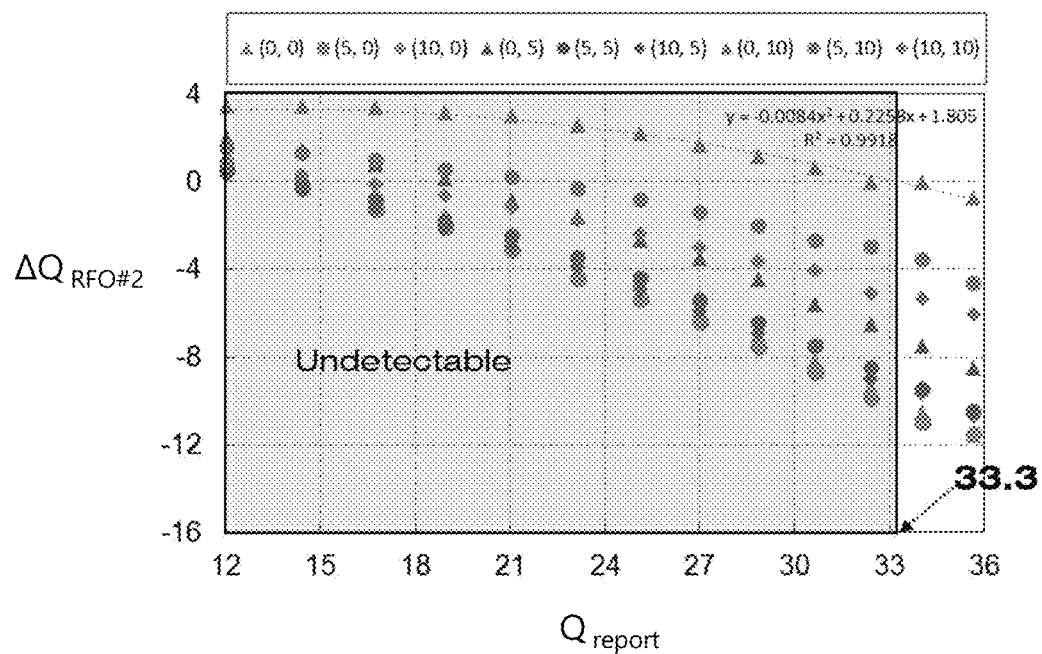
Figure 17C:
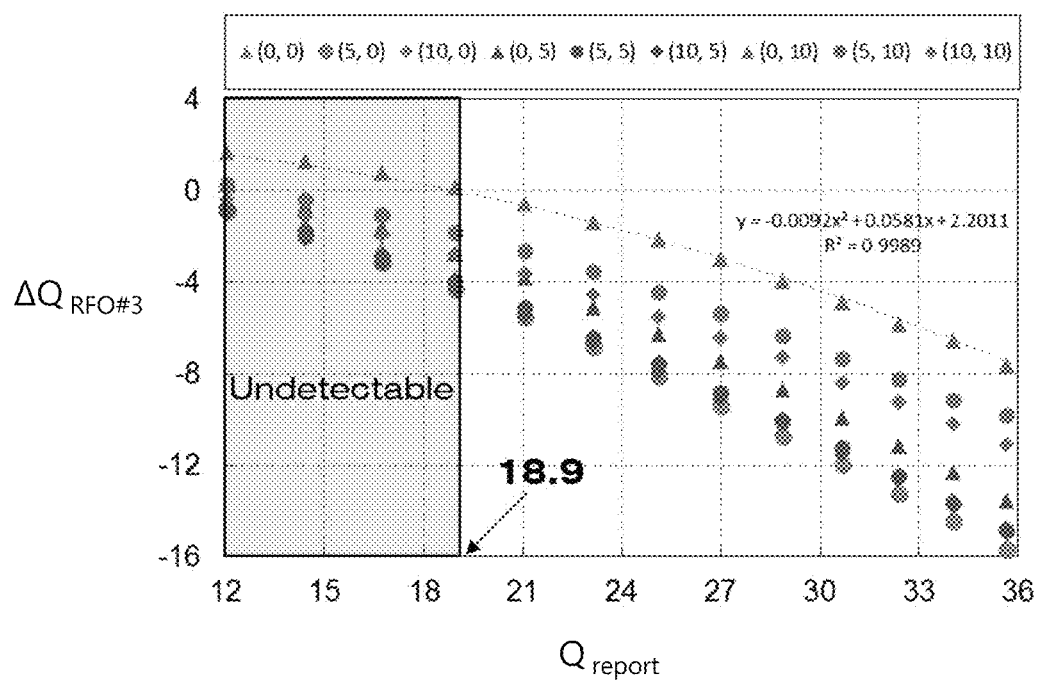
Figure 17D:
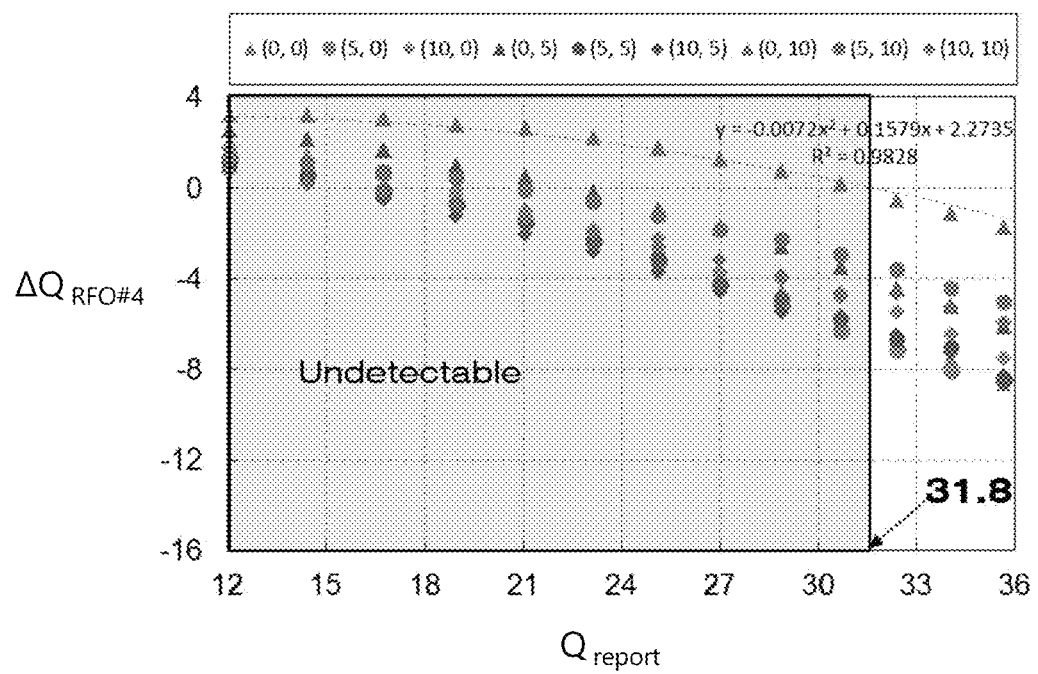

Referring to FIG. 17, FIG. 17(a) shows simulation results according to the environment of FIG. 16(a), FIG. 17(b) shows simulation results according to the environment of FIG. 16(b), FIG. 17(c) shows simulation results according to the environment of FIG. 16(c), and FIG. 17(d) shows simulation results according to the environment of FIG. 16(d).

A foreign object is a factor that decreases a Q factor. Accordingly, a Q factor value measured when a foreign object is present is generally less than a reference Q factor value when there is no foreign object. Therefore, when a method of detecting a foreign object using a Q factor value is employed, it is determined that a foreign object is present when a measured Q factor value is less than the reference Q factor value. However, when a measured Q factor value is equal to or greater than the reference Q factor value although a foreign object is present, it may be mistakenly determined that no foreign object is present. In other words, when a foreign object is introduced, a Q factor value becomes less than the reference Q factor value when there is no foreign object due to a loss caused by the foreign object in general. However, if the measured Q factor value becomes equal to or greater than the reference Q factor value (i.e., variation≥0), the foreign object cannot be detected.

Accordingly, in the present embodiment, an optimal reference Q factor is designed by setting a Q factor value reported by an arbitrary wireless power receiver (or a reference Q factor value with respect to the arbitrary wireless power receiver) as a variable and observing variation of a Q factor value measured when a representative foreign object is present with respect to the reference Q factor value.

In each graph of FIG. 17, the x axis represents a Q factor value Qreport or a reference Q factor value QRX.ref reported by a wireless power receiver to the reference wireless power transmitter and the y axis represents a difference or variation ΔQRFO between the reported reference Q factor value Qreport and an actually measured Q factor value due to a representative foreign object. Here, the Q factor variation ΔQRFO can be represented by the following equation.

$$\Delta Q_{RFO} = Q_{RX+RFO} - Q_{report} \quad \text{[Equation 1]}$$

Referring to Equation 1, QRX+RFO is a Q factor value measured when a representative foreign object is present, and Qreport is a Q factor value reported by the wireless power receiver.

A foreign object is undetectable in a section in which the Q factor value QRX+RFO measured in an environment in which a representative foreign object is inserted is equal to or greater than reported Q factor value Qreport of the x axis. When this is expressed with respect to the Q factor variation ΔQRFO, a section of reported Q factors when the Q factor variation ΔQRFO becomes equal to or greater than 0 may be called an undetectable section, and a section of reported Q factors when the Q factor variation ΔQRFO becomes less than 0 may be called a detectable section. Meanwhile, when a reported Q factor value when the Q factor variation ΔQRFO becomes 0 is referred to as a threshold Q factor value, a foreign object cannot be detected when a reported Q factor value is equal to or less than the threshold Q factor value (Qreport≤report.0x) and the foreign object can be detected when a reported Q factor value is greater than the threshold Q factor value (Qreport>Qreport.0x).

When a section of reported Q factor values in which an error may be generated during foreign object detection based on a Q factor is referred to as an undetectable section, as described above, the undetectable section can be confirmed from simulation results of FIG. 17. In each graph of FIG. 17, coordinates (a, b) represent a state in which the wireless power receiver is placed at a position having an offset of a mm on the x axis and an offset of b mm on the y axis from the center of the reference wireless power transmitter.

It is confirmed from simulation results that the threshold Q factor value is determined differently for representative foreign objects and chargeable area sizes.

First, a case in which a charging area is set to an area having a radius of 5 mm from the center point of the wireless power transmitter will be described. The threshold Q factor value is 21.4 in the case of FIG. 17(a) in which a first representative foreign object RFO #1 is used, 18.5 in the case of FIG. 17(b) in which a second representative foreign object RFO #2 is used, 12.2 in the case of FIG. 17(c) in which a third representative foreign object RFO #3 is used, and 22.2 in the case of FIG. 17(d) in which a fourth representative foreign object RFO #4 is used.

Next, a case in which a charging area is set to an area having a radius of 10 mm from the center point of the wireless power transmitter will be described. The threshold Q factor value is 30.5 in the case of FIG. 17(a) in which a first representative foreign object RFO #1 is used, 33.3 in the case of FIG. 17(b) in which a second representative foreign object RFO #2 is used, 18.9 in the case of FIG. 17(c) in which a third representative foreign object RFO #3 is used, and 31.8 in the case of FIG. 17(d) in which a fourth representative foreign object RFO #4 is used.

By comparing the threshold Q factor values depending on charging area sizes, it can be confirmed that the threshold Q factor value in the case of the charging area with the radius of 10 mm is greater than that in the case of the charging area with the radius of 5 mm.

Accordingly, a common detectable section for all representative foreign objects and all charging areas is a section in which Q factor values are greater than the threshold Q factor value of 33.3, and foreign objects may be detected or may not be detected in a section of reported Q factor values less than the threshold Q factor value of 33.3 depending on types of foreign objects.

Although 5 mm and 10 mm are exemplified as charging areas (or charging radiuses) in the present embodiment, these may be understood as a first charging area with a radius of x mm and a second charging area with a radius of y mm in a broad sense (y>x). In addition, the charging area with the radius of 10 mm may have a radius of about 10 mm, and the charging area with the radius of 5 mm may have a radius of about 5 mm.

According to an embodiment, an optimal reference Q factor can be designed on the basis of an optimal threshold Q factor value at which a foreign object can be detected for all foreign objects and all charging areas. In this case, the optimal threshold Q factor value used to obtain the optimal reference Q factor is 33.3. Hereinafter, a method of designing an optimal reference Q factor for all foreign objects and all charging areas will be disclosed.

In WPC standards, a reference Q factor value transmitted from a wireless power receiver to a wireless power transmitter needs to have an accuracy with an error of ±10%. That is, a reference Q factor value Qreport obtained when a wireless power receiver is designed or manufactured needs to meet the requirements of a minimum value of Qreport.min=0.9*Qreport and a maximum value of Qreport.max=1.1*Qreport in consideration of error in an actual wireless charging service. That is, an optimal reference Q factor value Q'report in consideration of error can be derived with a range in which the aforementioned requirements are satisfied.

Accordingly, to successfully detect all representative foreign objects, an optimal reference Q factor value Q'report is designed such that a minimum value corresponding to an error value (−10%) among measured Q factor values is greater than the optimal threshold Q factor value (33.3). That is, Q'report that satisfies Q'report>Qreport, where 0.9*Qreport=Qreport_min>33.3 can be designed as an optimal reference Q factor value. In this case, the optimal reference Q factor value Qreport>37, and thus the optimal reference Q factor Q'report can be designed as 37.1. Here, the optimal reference Q factor value is a minimum reference Q factor value that allows foreign object detection and thus may also be called a minimum reference Q factor value. Hereinafter, the optimal reference Q factor value will be referred to as the minimum reference Q factor value for convenience of description.

For example, the optimal reference Q factor value Q'report may be designed such that it belongs to a range of 37 to 38. In this case, when a reference Q factor value of an arbitrary wireless power receiver is equal to or less than 37, the arbitrary wireless power receiver fails to pass a foreign object detection performance test.

As another example, the optimal reference Q factor value Q'report may be designed such that it belongs to a range of 37.1 to 38. In this case, when a reference Q factor value of an arbitrary wireless power receiver is equal to or less than 37.1, the arbitrary wireless power receiver fails to pass a foreign object detection performance test.

As another example, the optimal reference Q factor value Q'report may be designed such that it is 37.1. In this case, when a reference Q factor value of an arbitrary wireless power receiver is equal to or less than 37.1, the arbitrary wireless power receiver fails to pass a foreign object detection performance test. On the other hand, when a reference Q factor value of an arbitrary wireless power receiver exceeds 37.1, the arbitrary wireless power receiver passes a foreign object detection performance test.

According to another embodiment, multiple optimal reference Q factors may be designed on the basis of multiple optimal threshold Q factor values at which foreign objects can be detected for respective charging areas or charging area sizes.

Figure 18:
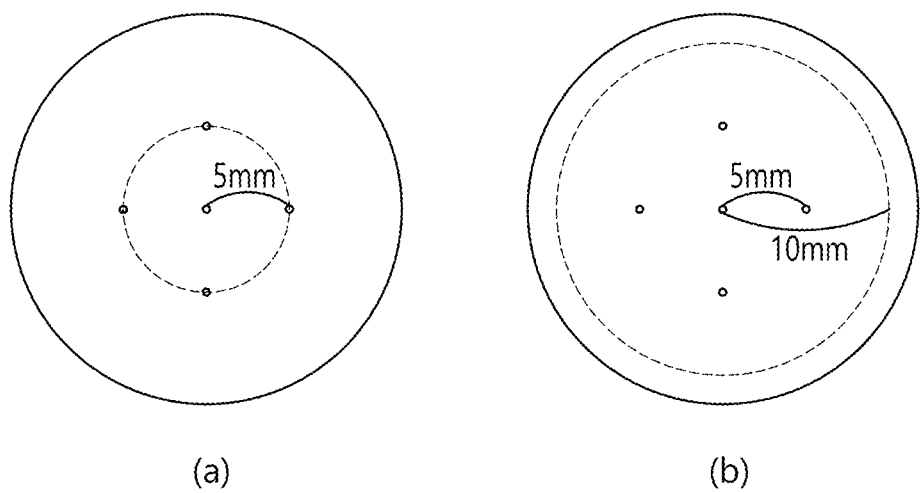
FIG. 18 illustrates a method of designing multiple reference Q factors in response to charging area sizes according to an embodiment.

FIG. 18 illustrates a method of designing multiple reference Q factors in response to charging area sizes according to an embodiment.

Referring to FIG. 18, (a) shows a case in which a charging area (indicated by a dotted line) having a radius of 5 mm is set, and a first optimal threshold Q factor value and a first optimal reference Q factor according thereto can be defined. (b) shows a case in which a charging area (indicated by a dotted line) having a radius of 10 mm is set, and a second optimal threshold Q factor value and a second optimal reference Q factor according thereto can be defined. Optimal reference Q factors defined for respective charging areas in this manner may be referred to as multiple reference Q factors.

First, in a case where the charging area having a radius of 5 mm is set, a first optimal threshold Q factor value used to obtain the first optimal reference Q factor is 22.2, and the first optimal reference Q factor value can be designed to be 24.7 to 25 according to Q'report>Qreport, where 0.9*Qreport=Qreport_min>22.2.

Next, in a case where the charging area having a radius of 10 mm is set, a second optimal threshold Q factor value used to obtain the second optimal reference Q factor is 33.3, as described above, and the second optimal reference Q factor value can be designed to be 37 to 38 according to Q'report>Qreport, where 0.9*Qreport=Qreport_min>33.3.

FIG. 19 is a flowchart illustrating a method of receiving, by a wireless power receiver, wireless power from a wireless power transmitter based on foreign object detection according to an embodiment.

Referring to FIG. 19, the wireless power receiver receives a digital ping from the wireless power transmitter (S1900). Then, the wireless power receiver transmits an identification and configuration packet to the wireless power transmitter (S1905). When the identification and configuration packet is transmitted to the wireless power transmitter, the wireless power receiver and the wireless power transmitter enter a negotiation phase.

In the negotiation phase, the wireless power receiver transmits a foreign object detection (FOD) status packet including a reference Q factor (Qreport) value of the wireless power receiver to the wireless power transmitter (S1910).

Here, the reference Q factor value is a Q factor of a reference wireless power transmitter with respect to the wireless power receiver when there is no foreign object nearby, and the reference Q factor value may be equal to or greater than a minimum reference Q factor value Q'report required for an arbitrary wireless power receiver compatible with the reference wireless power transmitter. In addition, the minimum reference Q factor value Q'report in the present embodiment may be an optimal reference Q factor value Q'report designed by the method illustrated in FIG. 17 and FIG. 18.

FIG. 20 illustrates a structure of an FOD status packet according to an example.

Referring to FIG. 20, the FOD status packet includes a reserved field, a type field, and an FOD support data field. The type field indicates whether a parameter indicated by the FOD support data field is a reference resonant frequency or a reference Q factor value. The FOD support data field can indicate a reference resonant frequency or a reference Q factor value according to indication of the type field.

Referring back to FIG. 19, the wireless power receiver receives wireless power from the wireless power transmitter according to magnetic coupling on the basis of a foreign object detection result of the wireless power transmitter using the reference Q factor value (S1915). If it is determined that a foreign object is detected, the wireless power transmitter does not transmit power on the basis of an extended power profile. In other words, when a foreign object is detected, the wireless power transmitter can transmit power on the basis of a basic power profile or stop power transmission and enter a standby state. In this case, the wireless power receiver can receive wireless power based on the basic power profile or cannot receive power. In the other hand, when it is determined that a foreign object is not detected, the wireless power transmitter can transmit wireless power on the basis of an extended power profile and the wireless power receiver can receive increased wireless power from the wireless power transmitter.

The operation of the wireless power receiver according to FIG. 19 can be performed by a communication/control unit of the wireless power receiver.

Figure 21:
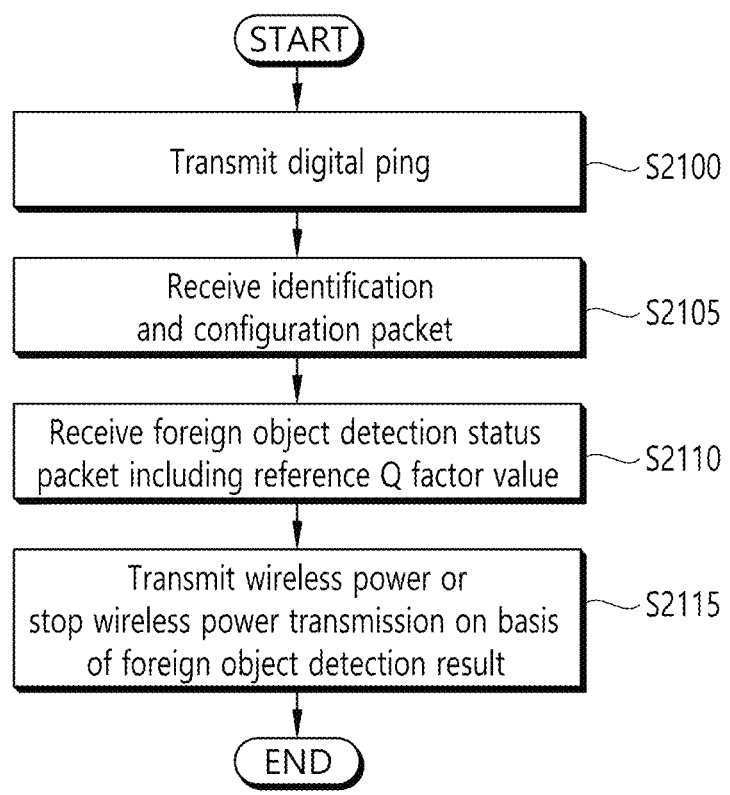
FIG. 21 is a flowchart illustrating a method of transmitting, by a wireless power transmitter, wireless power to a wireless power receiver based on foreign object detection according to an embodiment.

FIG. 21 is a flowchart illustrating a method of transmitting, by a wireless power transmitter, wireless power to a wireless power receiver based on foreign object detection according to an embodiment.

Referring to FIG. 21, the wireless power transmitter transmits a digital ping to the wireless power receiver (S2100).

Thereafter, the wireless power transmitter receives an identification and configuration packet from the wireless power receiver (S2105). When the identification and configuration packet is received from the wireless power receiver, the wireless power receiver and the wireless power transmitter enter a negotiation phase.

In the negotiation phase, the wireless power transmitter receives am FOD status packet including a reference Q factor (Qref) value of the wireless power receiver from the wireless power receiver (S2110). The FOD status packet may have the same structure as that in FIG. 20.

Here, the reference Q factor value is a Q factor of a reference wireless power transmitter with respect to the wireless power receiver when there is no foreign object nearby, and the reference Q factor value may be equal to or greater than a minimum reference Q factor value Q'report required for an arbitrary wireless power receiver compatible with the reference wireless power transmitter. In addition, the minimum reference Q factor value Q'report in the present embodiment may be an optimal reference Q factor value Q'report designed by the method illustrated in FIG. 17 and FIG. 18.

The wireless power transmitter transmits wireless power to the wireless power receiver according to magnetic coupling on the basis of a foreign object detection result of the wireless power transmitter using the reference Q factor value or performs initialization for entering a ping phase (S2115).

In step S2115, an example of a method of performing, by the wireless power transmitter, foreign object detection using a reference Q factor value when multiple charging areas are set as illustrated in FIG. 18 is as follows.

The wireless power transmitter measures a Q factor and determines whether the measured Q factor is greater than the second reference Q factor (e.g., 37).

If the measured Q factor is greater than the second reference Q factor, the wireless power transmitter performs wireless power transmission.

If the measured Q factor is equal to or less than the first reference Q factor (e.g., 25), the wireless power transmitter performs initialization for entering a ping phase by stopping or not starting wireless power transmission.

If the measured Q factor is equal to or less than the second reference Q factor (e.g., 37) and greater than the first reference Q factor (e.g., 25), the wireless power transmitter may display an alarm message to a user. For example, the wireless power transmitter can transmit an alarm message to the user through a message/beep representing that stability caused by inflow of a foreign object is not guaranteed for offsets of the wireless power receiver, which exceed 5 mm. In this case, wireless power transmission can be started. As another example, in a case where the wireless power transmitter can estimate a charging area, the wireless power transmitter can start wireless power transmission upon detecting that a charging radius is equal to or less than 5 mm. On the other hand, the wireless power transmitter can perform initialization for entering a ping phase without starting wireless power transmission or transmit an alarm message to a user and then start wireless power transmission upon detecting that the charging radius exceeds 5 mm.

The operation of the wireless power transmitter according to FIG. 21 can be performed by a communication/control unit of the wireless power transmitter.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A method for receiving, by a wireless power receiver, wireless power from a wireless power transmitter based on foreign object detection in a wireless power transmission system, the method comprising:

receiving a digital ping form the wireless power transmitter;

transmitting an identification and configuration packet to the wireless power transmitter;

transmitting a foreign object detection (FOD) status packet including a reference Q factor value $Q'_{report}$ of the wireless power receiver to the wireless power transmitter; and receiving wireless power by magnetic coupling from the wireless power transmitter on the basis of a foreign object detection result of the wireless power transmitter based on the reference Q factor value, wherein the reference Q factor value is a Q factor of a reference wireless power transmitter with respect to the wireless power receiver in a specific charging radius when a foreign object is not present nearby, and the reference Q factor value is equal to or greater than a minimum reference Q factor value $Q_{report\_min}$ required within the specific charging radius for an arbitrary wireless power receiver compatible with the reference wireless power transmitter.

2. The method of claim 1, wherein, when a Q factor value when a reference Q factor value $Q_{report}$ of the reference wireless power transmitter with respect to the arbitrary wireless power receiver when a foreign object is not present nearby is identical to a Q factor value $Q_{RX,RFO}$ of the reference wireless power transmitter with respect to the arbitrary wireless power receiver when a representative foreign object (RFO) is present nearby is a threshold Q factor value $Q_{report,0X}$ at which the representative foreign object is detectable, the minimum reference Q factor value is defined on the basis of the threshold Q factor value.

3. The method of claim 2, wherein the minimum reference Q factor value is defined as a value obtained by correcting the threshold Q factor value by a Q factor measurement error.

4. The method of claim 3, wherein the threshold Q factor value is a value within a range of 22 to 23, the Q factor measurement error is 10% of the threshold Q factor value, and the minimum reference Q factor value is defined as a value within a range of 24 to 26, based on that the specific charging radius is about 5 mm, and the threshold Q factor value is a value within a range of 33 to 34, the Q factor measurement error is 10% of the threshold Q factor value, and the minimum reference Q factor value is defined as a value within a range of 37 to 38, based on that the specific charging radius is about 10 mm.

5. The method of claim 4, wherein the threshold Q factor value is 22.2 and the minimum reference Q factor value is a value within a range of 24.7 to 25, based on that the specific charging radius is about 5 mm.

6. The method of claim 4, wherein the threshold Q factor value is 33.3 and the minimum reference Q factor value is a value within a range of 37.1 to 38, based on that the specific charging radius is about 10 mm.

7. The method of claim 2, wherein the representative foreign object is a representative foreign object that maximizes the threshold Q factor value among various types of representative foreign objects.

8. A method for transmitting, by a wireless power transmitter, wireless power to a wireless power receiver based on foreign object detection in a wireless power transmission system, the method comprising:

transmitting a digital ping to the wireless power receiver;
receiving an identification and configuration packet from the wireless power receiver;
receiving a foreign object detection status packet indicating a reference Q factor value $Q'_{report}$ of the wireless power receiver from the wireless power receiver;
performing foreign object detection based on the reference Q factor value; and
transmitting wireless power by magnetic coupling to the wireless power receiver on the basis of a result of the foreign object detection, wherein the reference Q factor value is a Q factor of a reference wireless power transmitter with respect to the wireless power receiver in a specific charging radius when a foreign object is not present nearby, and
the reference Q factor value is equal to or greater than a minimum reference Q factor value $Q_{report\_min}$ required within the specific charging radius for an arbitrary wireless power receiver compatible with the reference wireless power transmitter.

9. The method of claim 8, wherein, when a Q factor value when a reference Q factor value $Q_{report}$ of the reference wireless power transmitter with respect to the arbitrary wireless power receiver when a foreign object is not present nearby is identical to a Q factor value $Q_{RX,RFO}$ of the reference wireless power transmitter with respect to the arbitrary wireless power receiver when a representative foreign object (RFO) is present nearby is a threshold Q factor value $Q_{report,0X}$ at which the representative foreign object is detectable, the minimum reference Q factor value is defined on the basis of the threshold Q factor value.

10. The method of claim 9, wherein the minimum reference Q factor value is defined as a value obtained by correcting the threshold Q factor value by a Q factor measurement error.

11. The method of claim 10, wherein the threshold Q factor value is a value within a range of 22 to 23, the Q factor measurement error is 10% of the threshold Q factor value, and the minimum reference Q factor value is defined as a first reference Q factor value within a range of 24 to 26, based on that the specific charging radius is about 5 mm, and the threshold Q factor value is a value within a range of 33 to 34, the Q factor measurement error is 10% of the threshold Q factor value, and the minimum reference Q factor value is defined as a second reference Q factor value within a range of 37 to 38, based on that the specific charging radius is about 10 mm.

12. The method of claim 11, further comprising measuring a Q factor value, wherein the transmitting of the wireless power is performed on the basis of a result of comparison between the measured Q factor value and the first reference Q factor value and the second reference Q factor value.

13. The method of claim 12, wherein the transmitting of the wireless power comprises:

transmitting the wireless power based on that the measured Q factor value is greater than the second reference Q factor value;
entering a ping phase based on that the measured Q factor value is equal to or less than the first reference Q factor value; and
displaying an alarm message with respect to a foreign object based on that the measured Q factor value is equal to or less than the second reference Q factor value and greater than the first reference Q factor value.

* * * * *